July 26, 1960

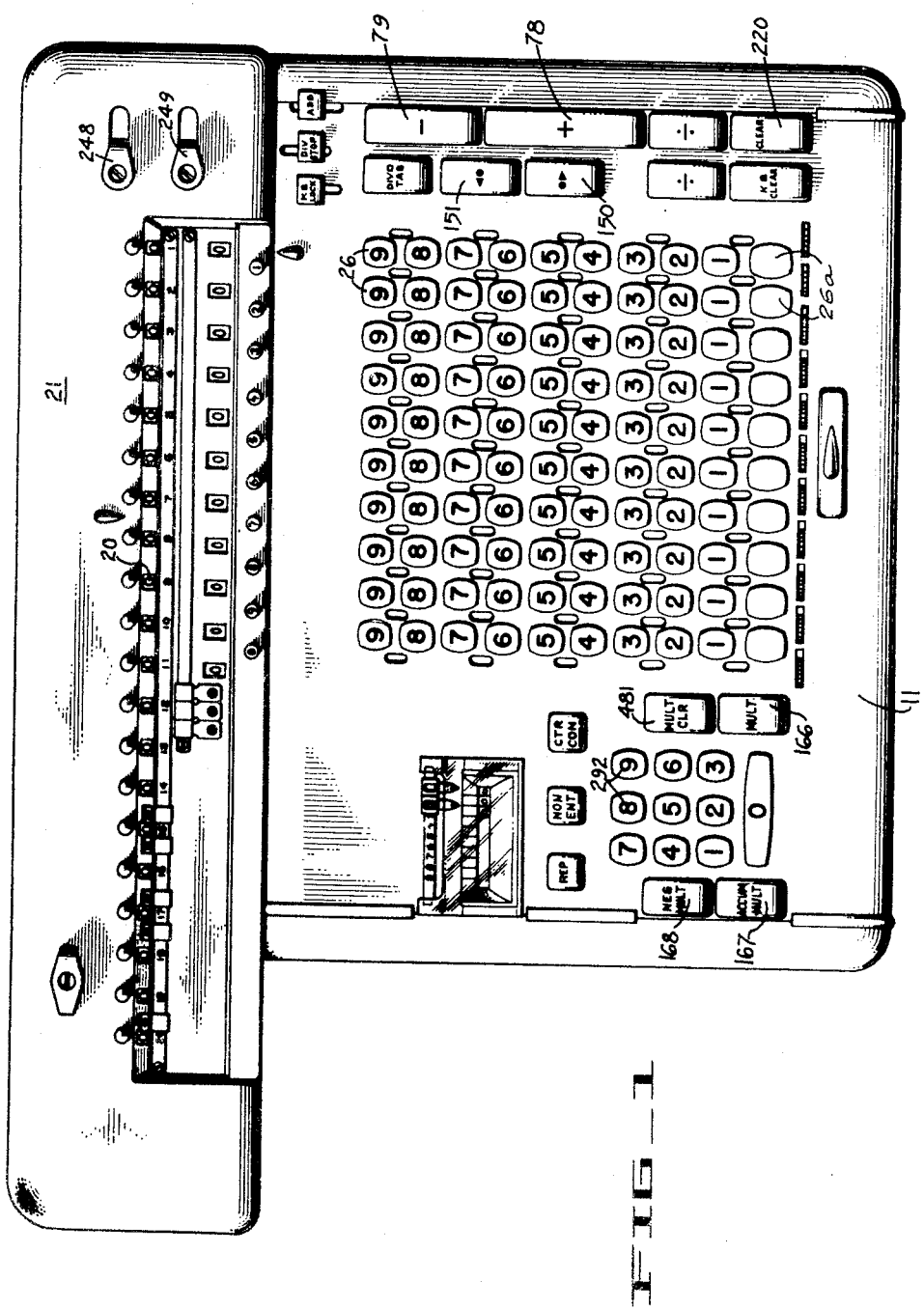

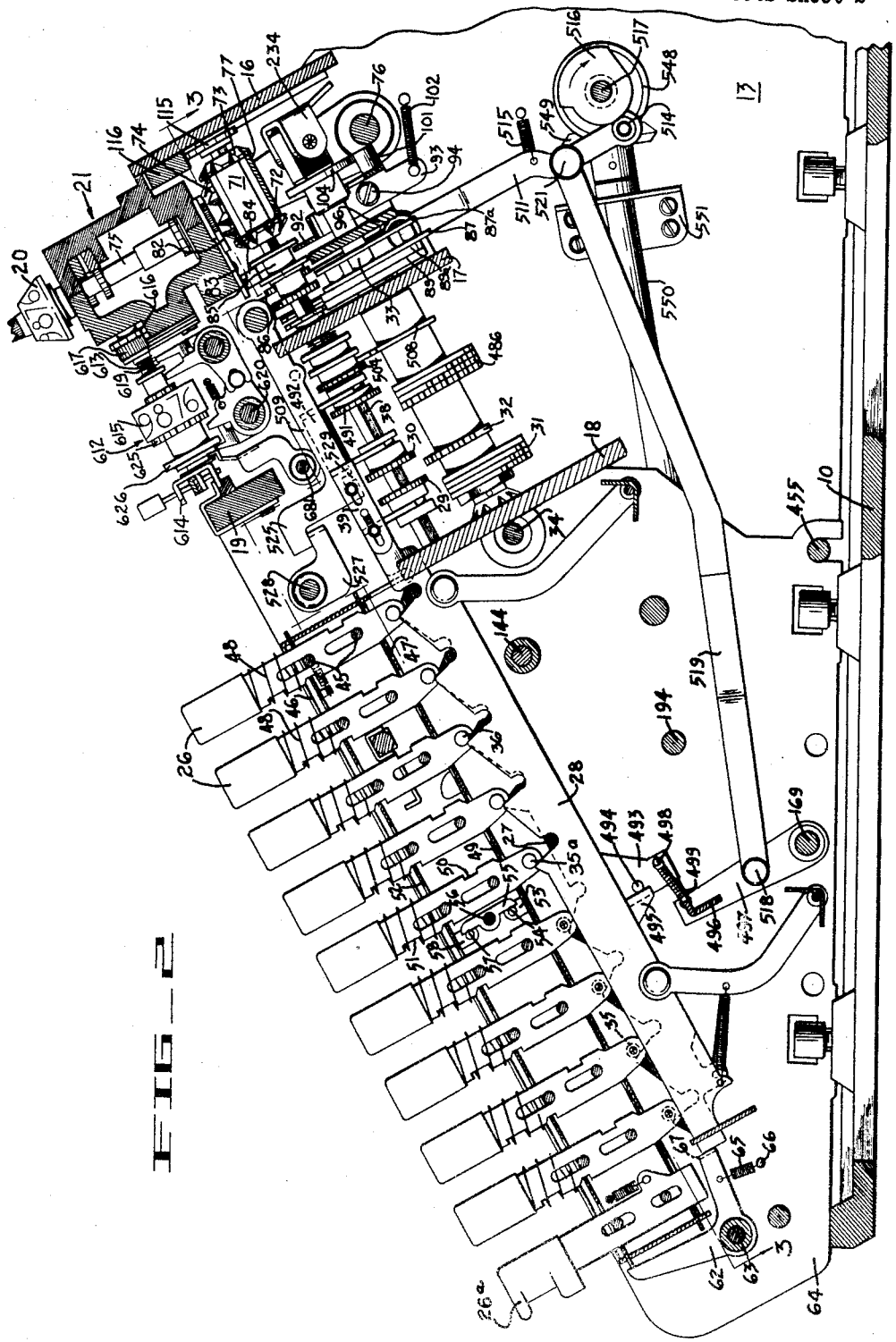
FIG_2

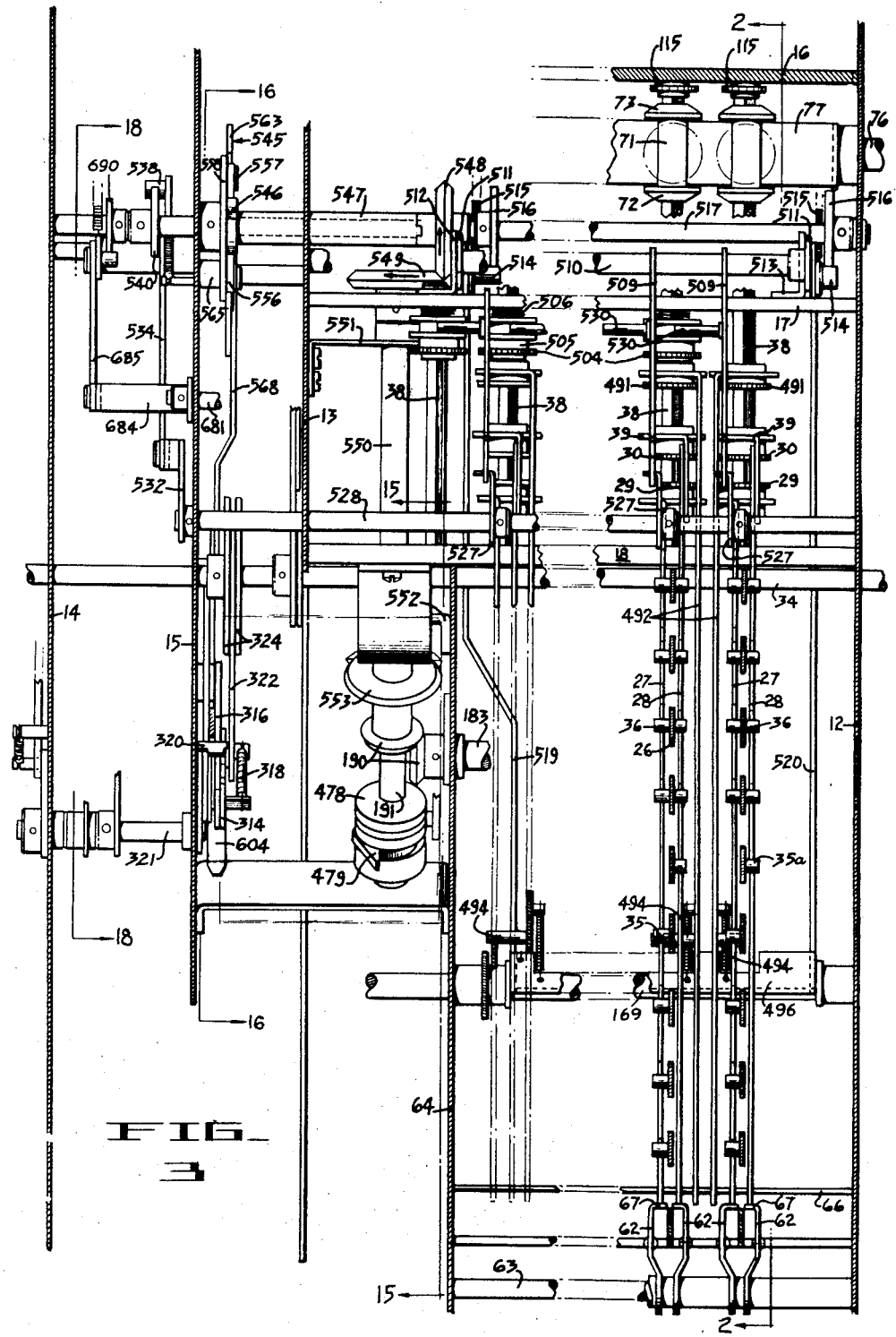

A. J. MALAVAZOS 2,946,506

MULTIPLYING MECHANISM

Filed May 21, 1957

July 26, 1960
A. J. MALAVAZOS
2,946,506
MULTIPLYING MECHANISM
Filed May 21, 1957
15 Sheets-Sheet 5
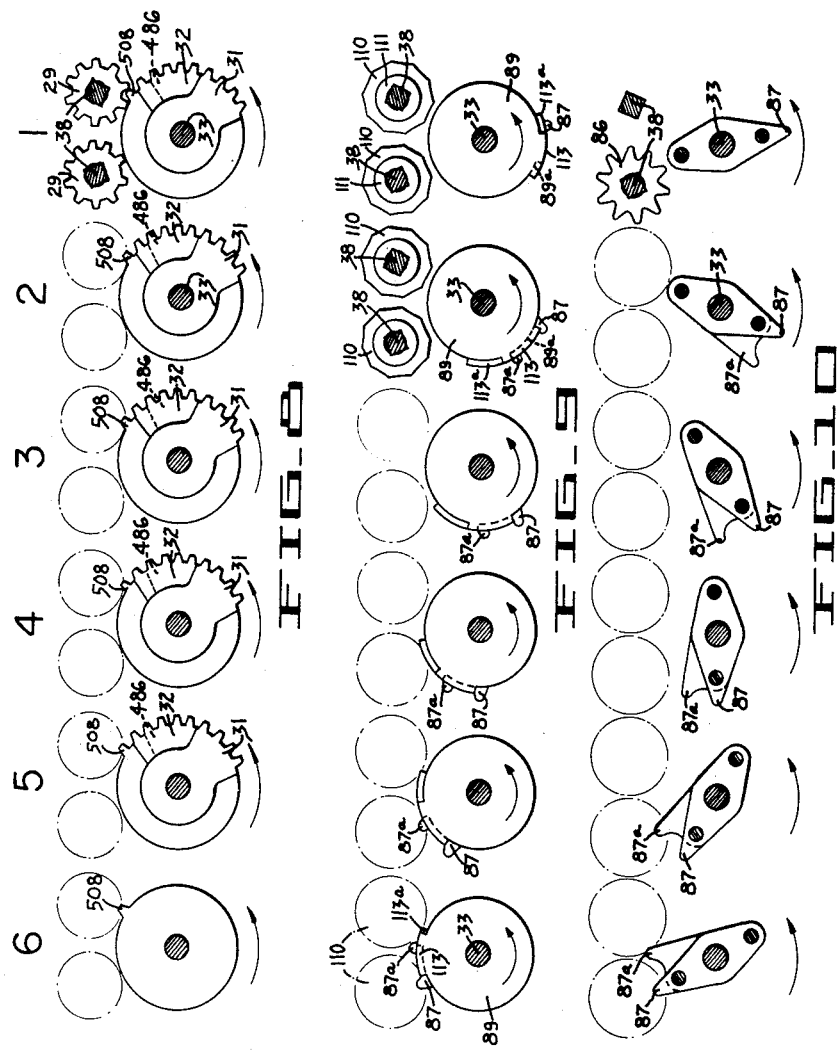

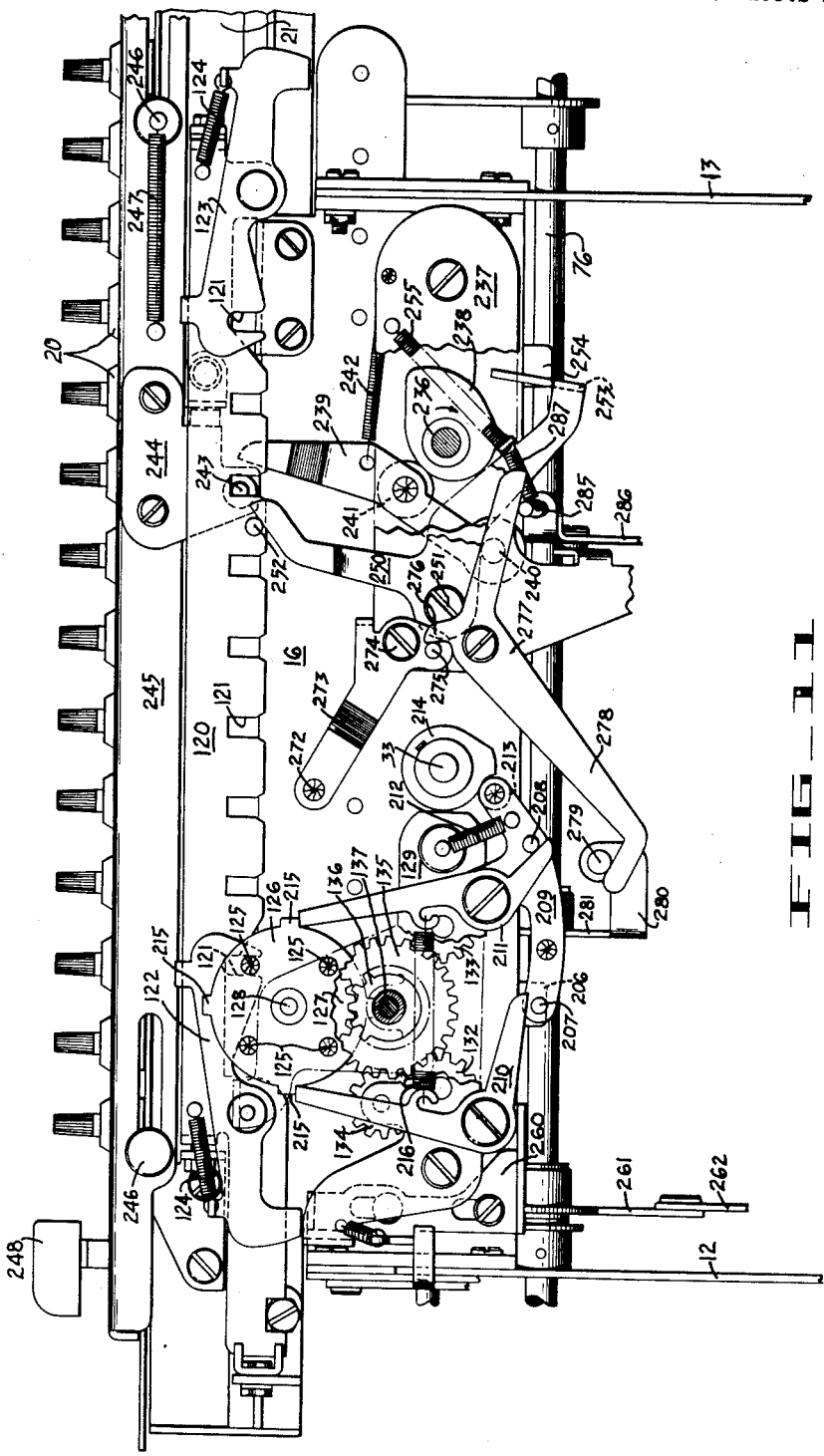

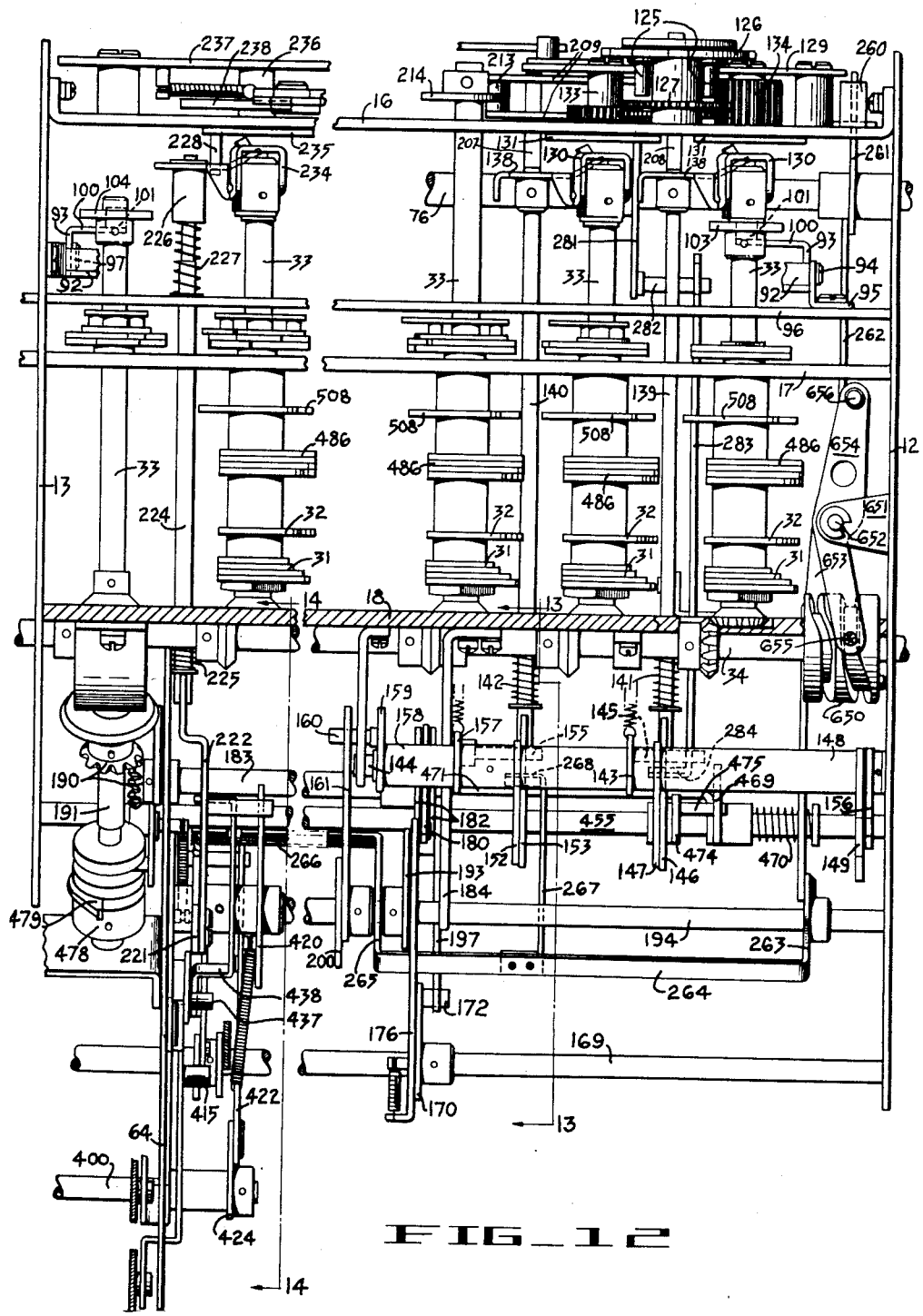
FIG_12

July 26, 1960

A. J. MALAVAZOS 2,946,506

MULTIPLYING MECHANISM

Filed May 21, 1957

July 26, 1960
A. J. MALAVAZOS
2,946,506
MULTIPLYING MECHANISM
Filed May 21, 1957
15 Sheets-Sheet 9
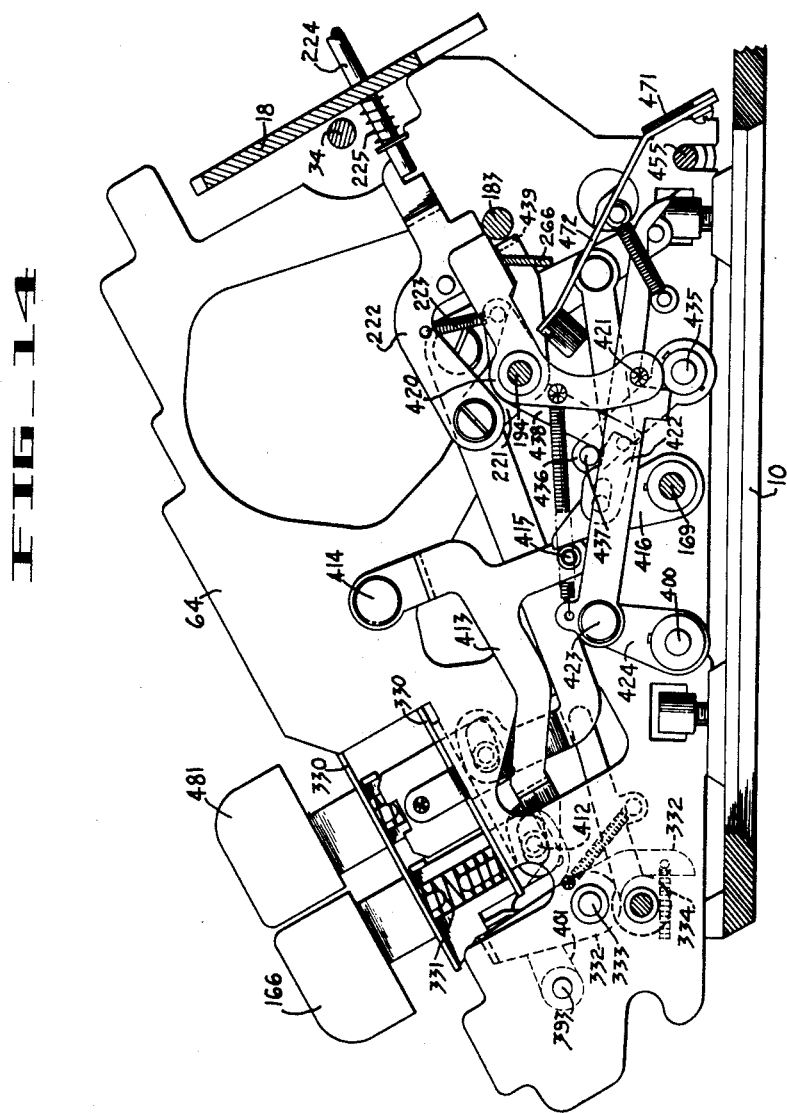
FIG_14

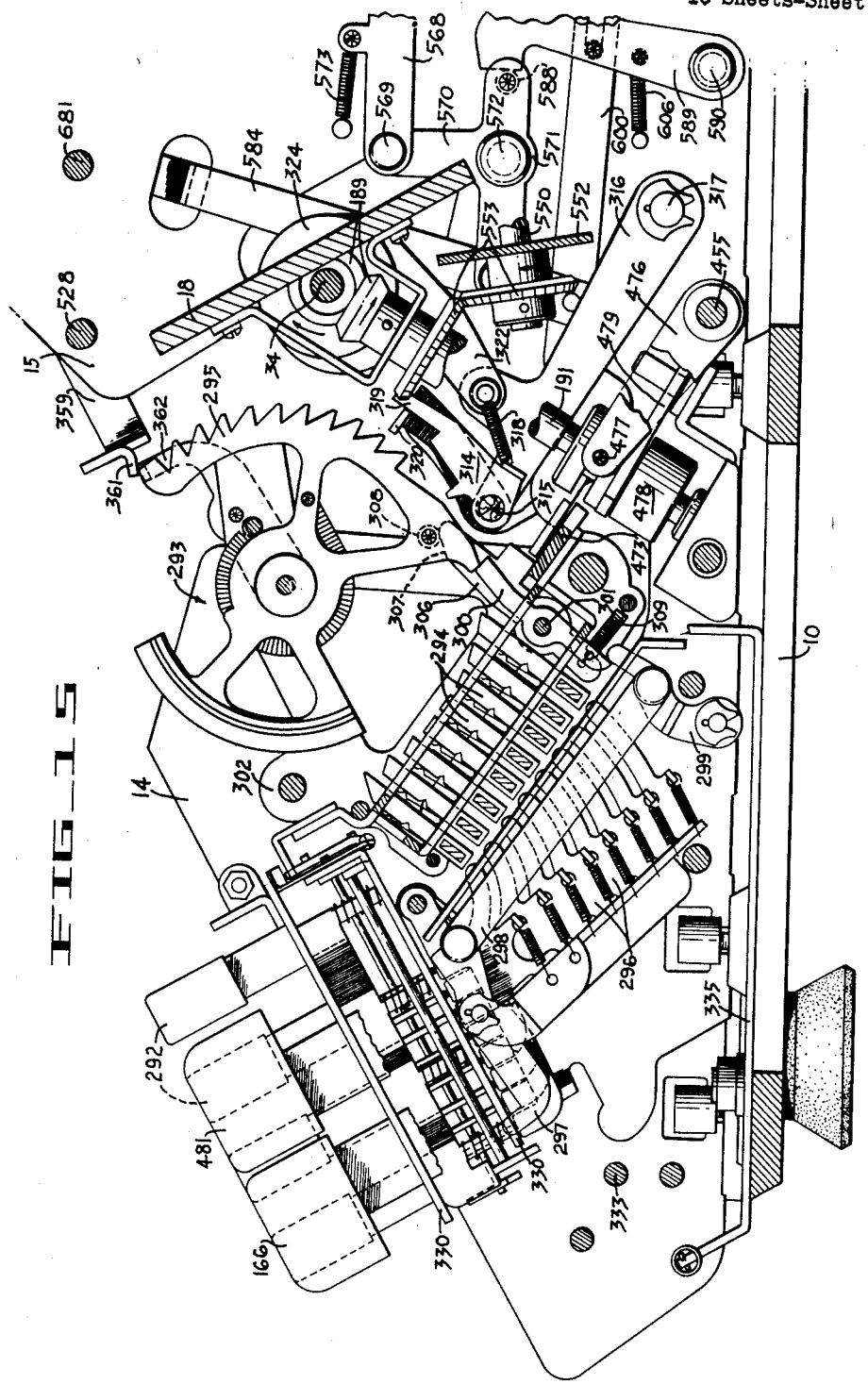

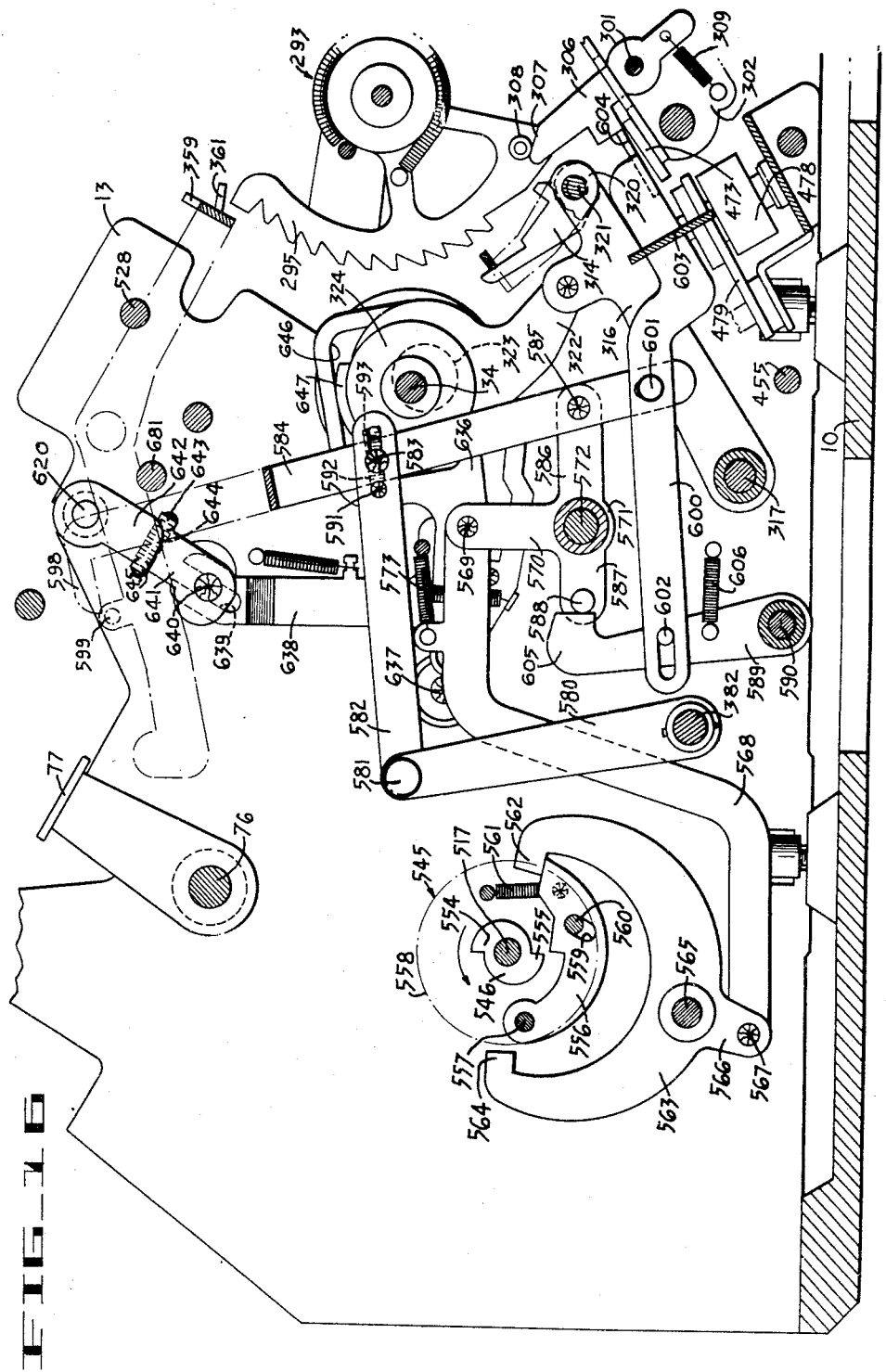

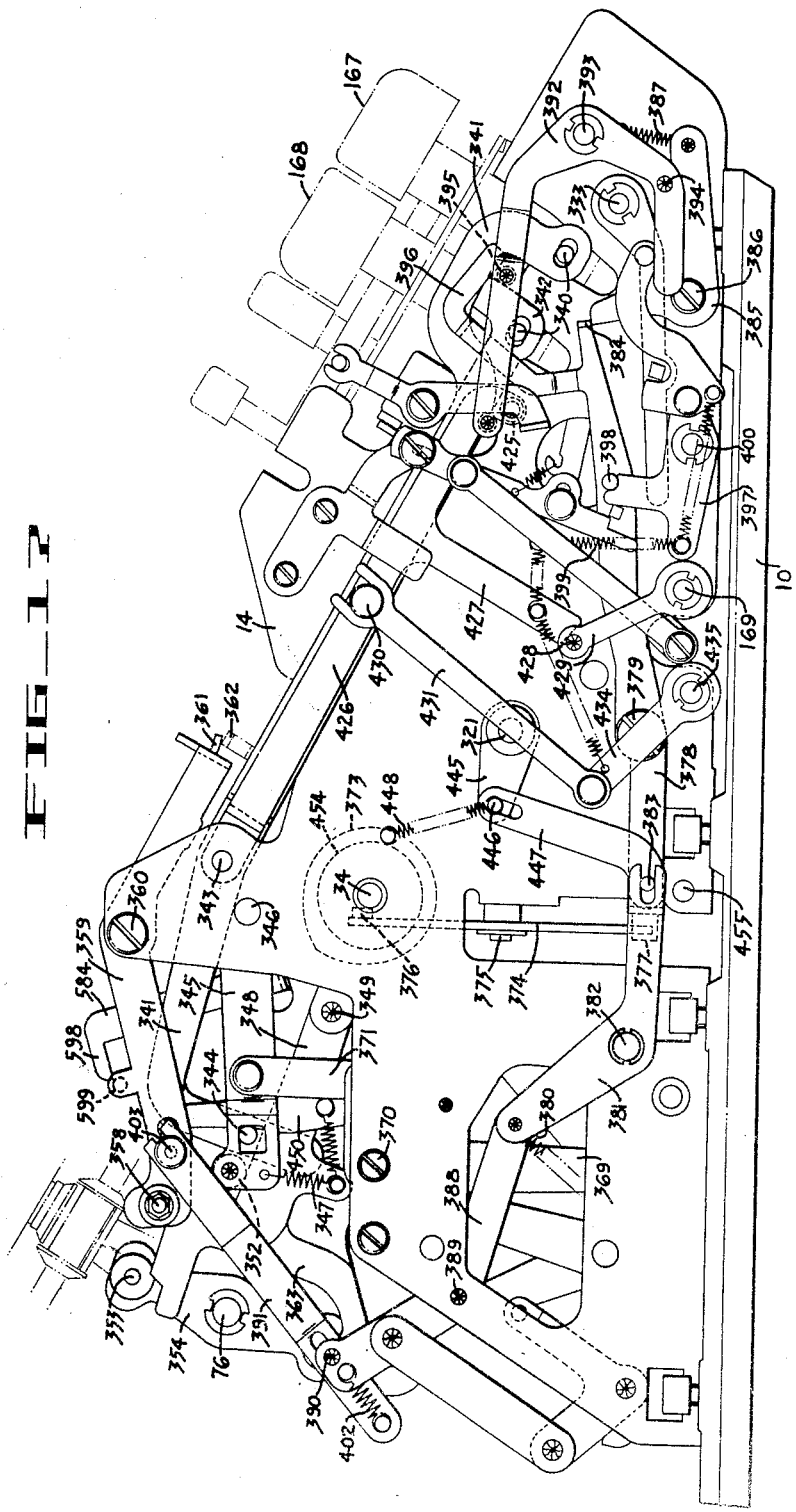

July 26, 1960 A. J. MALAVAZOS 2,946,506
MULTIPLYING MECHANISM
Filed May 21, 1957 15 Sheets-Sheet 13

July 26, 1960
A. J. MALAVAZOS
2,946,506
MULTIPLYING MECHANISM
Filed May 21, 1957
15 Sheets-Sheet 14
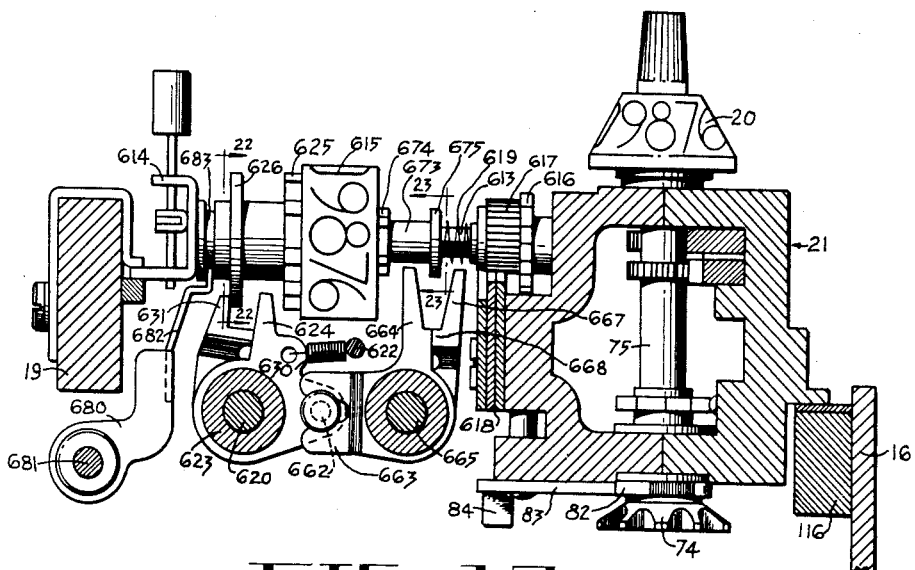
FIG_19
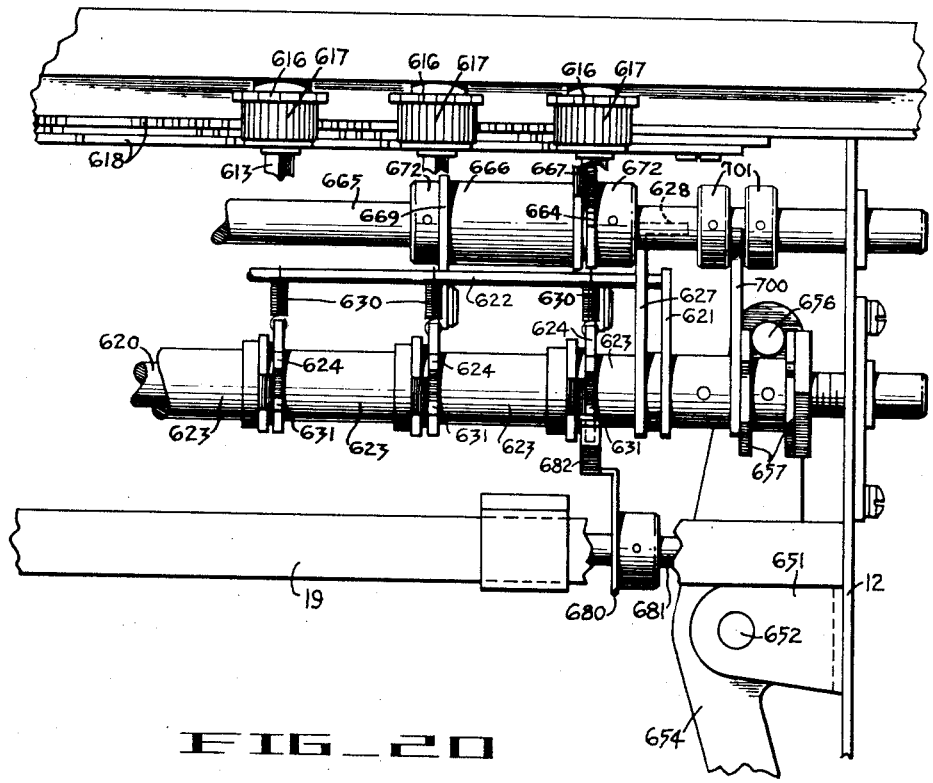
FIG_20

July 26, 1960
A. J. MALAVAZOS
2,946,506
MULTIPLYING MECHANISM
Filed May 21, 1957
15 Sheets-Sheet 15
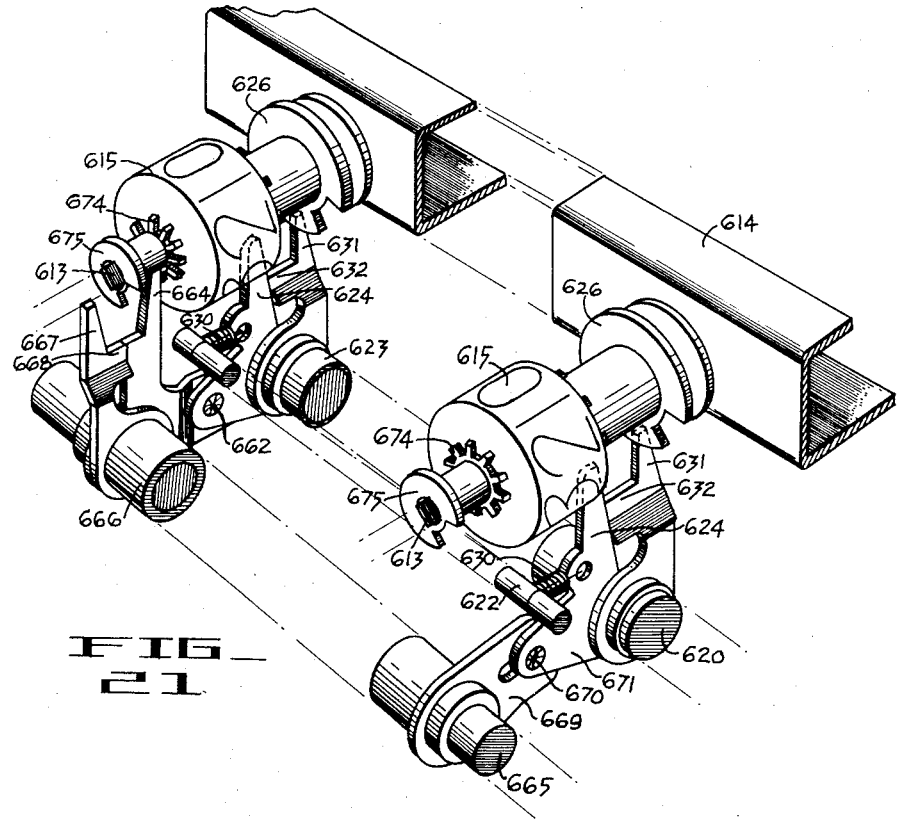
FIG_21
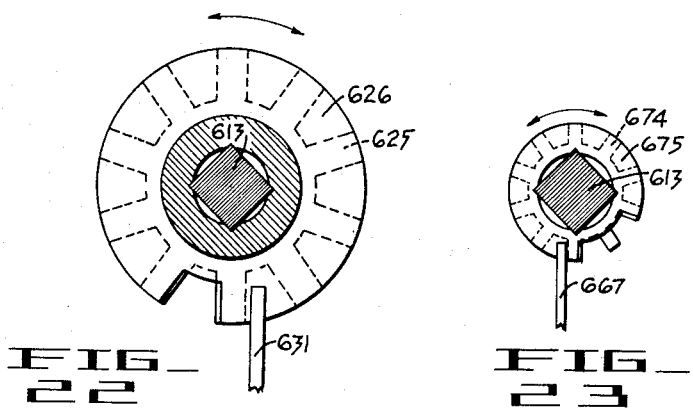
FIG_22
FIG_23

United States Patent Office 2,946,506
Patented July 26, 1960

2,946,506

MULTIPLYING MECHANISM

Arthur J. Malavazos, Hayward, Calif., assignor to Friden, Inc., a corporation of California Filed May 21, 1957, Ser. No. 660,626

13 Claims. (Cl. 235—63)

The present invention relates to calculating machines, and more particularly to an improved calculating machine of the Thomas-type as disclosed in the patents to Friden Nos. 2,229,889 and 2,371,752, and the patent to Friden et al. No. 2,399,917.

It is an object of the invention to provide, in a calculating machine, an improved automatic multiplication mechanism which will perform multiplication problems rapidly in a minimum number of machine cycles.

Another object of the invention is to provide improved automatic multiplication mechanism in which the drive for the entire multiplication operation is effected by cyclic actuation of the main drive means.

Another object of the invention is to provide an automatic multiplication mechanism of an improved type in which the number of machine cycles required to perform a multiplying operation is greatly reduced when any of the digits of a multiplier factor are greater than "1."

A further object of the invention is to provide an improved automatic multiplication mechanism in a calculating machine wherein a program control is effective to determine the number of machine cycles in accordance with the value of each of the digits of a multiplier.

Another object of the invention is the provision of means in an automatic multiplication mechanism for sensing each digit of a multiplier to thereby determine operation of an improved programming mechanism.

Another object of the invention is to provide an improved multiplying mechanism for calculating machines in which each multiplier digit greater than "1" determines a plural registration of a multiplicand with each machine cycle.

A further object of the invention is to provide a calculating machine with an improved multiplication mechanism for cyclically controlling plural registrations of a multiplicand upon the occurrence of a digit greater than "1" in the multiplier and effecting registration of the multiplier in the revolutions counter.

Other objects will appear from the following description of a preferred embodiment of the invention as illustrated in the accompanying drawings in which:

Fig. 1 is a plan view of the machine.

Fig. 2 is a longitudinal sectional elevational view of the machine, taken along the plane substantially as indicated by line 2—2 of Fig. 3.

Fig. 3 is a fragmentary plan view of the machine taken on the planes parallel to the keyboard indicated by the lines 3—3 in Fig. 2.

Fig. 8 is a transverse elevational view showing actuators, the view being taken from the front.

Fig. 9 is a transverse elevational view taken from the front to show the Geneva blocks.

Fig. 10 is a transverse elevational view taken from the front to show the relative position of the tens transfer actuators.

Fig. 11 is a fragmentary rear elevational view of the machine.

Fig. 12 is a fragmentary plan view of the machine taken along a plane below the keyboard and selection mechanism.

Fig. 14 is a sectional elevational view showing a portion of the multiplication control mechanism, the view being taken along the plane indicated by the line 14—14 in Fig. 12.

Fig. 15 is a fragmentary sectional elevational view of the multiplier mechanism taken from the right along a plane immediately to the left side of the mounting plate shown in Fig. 14, such as indicated by the line 15—15 in Fig. 3.

Fig. 16 is a fragmentary sectional elevational view of the multiplier control mechanism, the view being taken along the plane indicated by the line 16—16 in Fig. 3.

Fig. 17 is an elevational view of the left side of the machine.

Fig. 18 is a fragmentary sectional elevational view of the rear portion of the machine as viewed from the left, and with certain parts removed to more clearly show a portion of the invention, the view being taken along the plane indicated by the line 18—18 in Fig. 3.

Fig. 20 is a fragmentary plan view of the revolutions counter actuator and auxiliary actuator.

Fig. 21 is a detail in perspective of the units order and tens order revolutions counter dials left to right, respectively, showing the actuator control therefor.

Fig. 22 is a sectional elevational view of a revolutions counter dial assembly taken from the front along the plane indicated by the line 22—22 in Fig. 19.

Fig. 23 is a sectional elevational view of a revolutions counter dial assembly taken from the rear along the plane indicated by the line 23—23 in Fig. 19.

Figure 7:
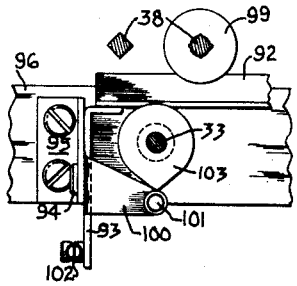
Fig. 7 is a fragmentary rear elevational view showing one of the two similar cams for controlling the tens-transfer restoring bail.

The invention is illustrated in connection with the type of calculating machine having a unidirectionally operable actuator and reversible, or bidirectionally operable, numeral wheels, as disclosed in the afore-mentioned Patent No. 2,229,889. While certain features of my invention are adapted particularly for use in this type of machine, certain of such features and other features of the invention can be used in other types of calcuating machines.

*Selecting, actuating and accumulating mechanisms*

The machine includes a base 10 (Fig. 2) which supports casing 11 (Fig. 1) and has side frame members 12, 13 and 14 and auxiliary frame member 15 (Fig. 3) mounted thereon. Side frame members 12 and 13 are connected by various transverse frame members 16, 17, 18 and 19 (Fig. 2) which serve to mount various mechanisms referred to hereinafter. The accumulator register comprises a series of reversible numeral wheels 20 in register carriage 21 which is supported forwardly and rearwardly on bars secured on transverse frame members 19 and 16 for endwise shifting movement laterally of the machine in either direction to various ordinal positions. The values to be introduced in the numeral wheels 20 are selected by means of a plurality of rows, or orders, of settable value keys 26, one of which orders is illustrated in Fig. 2. Each order of keys 26 cooperates with selecting mechanism including a pair of spring-urged slides 27, 28 mounted for endwise movement to selectively position the associated pair of ten-toothed selection gears 29, 30 for cooperation with the stepped teeth of an actuating cylinder 31 and a five-toothed sector 32, respectively, in accordance with the value of the depressed key. It will be noted that for each adjacent pair of the transversely spaced orders of the selection mechanism there is provided a single longitudinal actuating shaft 33 having an actuating cylinder 31 for a "1" to "4" selection and a five-toothed sector 32 for a "5" selection mounted thereon. Each actuating shaft 33 has a suitable bevel gear connection with transverse drive shaft 34 which is suitably journalled in side frame members 12, 14 and auxiliary frame member 15. Shaft 34 and therefore each of shafts 33 are driven cyclically from an electric motor through a conventional clutch which is controlled in a well-known manner, as described in the afore-mentioned Patent No. 2,229,889. As explained in said patent, the cyclically operable clutch is engaged or disengaged in the full-cycle position thereof.

Referring to Fig. 8, it will be noted that the actuating cylinders 31 and five-toothed sectors 32 are similarly angularly positioned on the corresponding actuator shafts 33. There are four teeth on the periphery of the cylinder 31, the upper tooth shown in Fig. 2 being the shortest while the three succeeding teeth are each longer by equal increments. The arrangement of the cylinders 31 and sectors 32 on shafts 33 is such that the five teeth of the sectors 32 become active first for a "5" selection followed by the operation of the stepped toothed actuators 31 when a "6" to "9" selection is to be made. Inasmuch as the angular positioning of the actuating cylinders 31 and sectors 32 is identical on all of the shafts 33, the digitation phase of an operation is begun simultaneously in the odd-numbered orders and simultaneously in the even-numbered orders and is completed in approximately 185° of each machine cycle.

Figure 5:
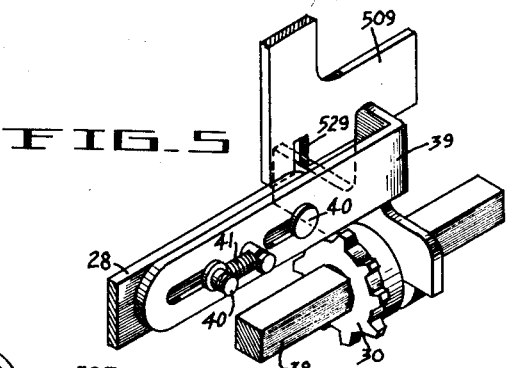
Fig. 5 is a detail, in perspective, of the "5" selection mechanism.

Each pair of gears 29 and 30 (Fig. 2) is slidably and nonrotatably mounted on square shafts 38 for movement to active position under the control of the respective selection slides 27 and 28. Each slide 27 is provided with a yoke formed at right angles to the rearward end thereof engaged in an annular groove in the associated gear 29, while each slide 28 carries a yieldable yoke 39 engaged in an annular groove in the corresponding gear 30. Yoke 39 is mounted for rectilinear motion on the rearward end of slide 28 by the engagement of pins 40 (Fig. 5) on slide 28 with elongated slots in yoke 39 and is normally urged to the position shown in Figs. 2, 3, 4 and 5 by a spring 41. Yoke 39 may be moved to the rear against the urgency of the spring 41 in the performance of a multiplication operation, as will be described hereinafter.

The differential movement of the slides 27, 28 and respective gears 29, 30 is determined by the depression of the keys 26 (Fig. 2). Each key is provided with a pair of elongated slots, through each of which a rod 45 extends transversely of the keyboard between upper and lower keyboard plates 46 and 47 to control the upward and downward movement of the keys. The "1" to "4" keys in each keyboard order is provided at its lower end with a pin 35 for cooperation with progressively increasing inclined surfaces on the selection slide 27 associated with each order. Each selection slide 27 is provided with two similar sets of four such inclined surfaces, the other set of which cooperates with the pins 36 (Figs. 2 and 3) on the lower end of the "6" to "9" keys in each keyboard order. Pins 36 extend to either side of the "6" to "9" keys for cooperation with the associated one of five uniformly inclined surfaces on selection slide 28. The "5" key in each keyboard order is provided with a pin 35–a extending in a direction opposite, or opposed to, the extension of the pins 35 on the "1" to "4" keys for cooperation with the remaining one of the five inclined surfaces on the associated slide 28.

A depression of the "1" or "6" key 26 in each keyboard order serves to impart an increment of forward movement to selection gear 29 to align the gear with the single tooth on the associated cylinder 31. A depression of the "2" or "7" key serves to move selection gear 29 forwardly two increments (to the left in Figs. 2 and 4) to align the gear with the two-toothed portion of the cylinder 31. The "3" or "8" key functions in a similar manner to align the selection gear 29 with the three-toothed portion of cylinder 31, and the "4" or "9" key functions similarly to move the selection gear 29 into alignment with the four-toothed portion of the cylinder 31. A depression of the "5" key serves to move the associated selection slide 28 forwardly (or to the left in Figs. 2 and 4) to position selection gear 30 for engagement by the corresponding five-toothed sector 32. In addition to the differential leftward movement of the slide 27 and corresponding selection gear 29 by the depression of one of the "6" to "9" keys, each of these keys functions in a manner similar to that of the "5" key to move the associated selection gear 30 to its operative position. Thus, it can be seen that the depression of a "1" to "4" key serves to move only gear 29 to an active position with respect to cylinder 31 in accordance with the key depressed. Likewise, the depression of a "5" key operates to actively position the gear 30 relative to sector 32, whereas, the depression of a "6" to "9" key effects an operative positioning of both the associated gears 29 and 30. The main drive shaft 34 and actuator shafts 33 will therefore be effective, upon rotation thereof, to impart increments of rotation to the square shafts 38 in each order corresponding to the ordinal key depressed.

Each key 26 is held in its depressed position against the urgency of spring 48 by a conventional means comprising a spring-urged latch slide 49 (Fig. 2) extending along each ordinal row of keys and adapted upon depression of the key to enter notch 50 therein. Adjacent its upper end the key is provided with a notch 51 similar to notch 50 and adapted for engagement by an auxiliary latch slide 52 spring-urged to the rear (to the right as viewed in Fig. 2), and serving, upon depression of the key, to enable movement of the selection slide 27 and/or 28 associated therewith. All keys in the keyboard may be released simultaneously by conventional means (not shown) which effects a rearward movement of the latch slides 49. Any depressed key in any one order may be released by the rearward movement of the associated latch slide 49 under control of the "0" key 26–a in that order. Inasmuch as there is a secondary, or auxiliary, latch slide 52 associated with each order of keys, the rearward movement of the latch slide 49 must effect a forward movement of the corresponding latch slide 52. For this purpose, each latch slide 49 is provided with an ear 53 formed at right angles thereto, which carries a pin 54 engaging the forward edge of a depending arm of a lever 55 rockably mounted on a shaft 56 extending transversely between upper and lower keyboard plates 46 and 47. The upper arm of lever 55 abuts a pin 57 on a depending ear 58 formed at right angles to latching slide 52. Thus, it can be seen that upon rearward movement of latch slide 49, lever 55 is rocked (counter-clockwise in Fig. 2) to move the corresponding latch slide 52 forwardly, or to the left, simultaneously to release any key which may have been latched in depressed position.

The selection slides 27, 28 associated with each bank of keys are normally blocked against movement from their inactive position. A bellcrank 62 (Figs. 2 and 3) is provided for each slide 27, 28 and is rockably mounted on a transverse shaft 63 journalled at its ends in side frame member 12 and auxiliary frame member 64. The vertical arms of each pair of bellcranks 62 are normally urged into engagement with the forward end of the secondary latch slide 52 by similar springs 65, each of which is supported at its one end by a transverse shaft 66 secured at its ends in side frame member 12 and auxiliary frame member 64 and the other end of which is hooked in an aperture in the horizontal arms of each pair of bellcranks 62. At its extremity the horizontal arm of each bellcrank is provided with an ear 67 formed at right angles thereto and contiguous with the forward end of the associated selection slides 27, 28 in the inactive position thereof. However, upon depression of a "1" to "4" key, the secondary latch slide 52 associated therewith is moved to the left simultaneously with the movement of the corresponding slide 49 to the right to impart a counter-clockwise rocking movement to the associated pair of bellcranks 62 immediately prior to the translation of the selection slide 27 to the left. Upon full depression of a "1," "2," "3" or "4" key and, immediately upon latching thereof in depressed position, secondary latch 52 is retracted and the ear 67 of the bellcrank 62 associated with selection slide 27 comes to rest on top of the slide while the ear 67 of the bellcrank 62 associated with the adjacent slide 28 is immediately restored under the urgency of its spring 65 into blocking relation with slide 28. Similarly, upon depression of a "5" key, the pair of bellcranks 62 are rocked counter-clockwise and, in the latched position of the key, the ear 67 of the bellcrank 62 associated with selection slide 28 comes to rest on the upper edge thereof in the actively moved position of the slide 28, while the ear 67 of the bellcrank 62 associated with adjacent slide 27 is restored into blocking relation with respect to the slide. In like manner, the depression of a "6," "7," "8," or "9" key imparts counter-clockwise rotation to the associated pair of bellcranks 62 and, upon latching of the selected key in its depressed position, the ears 67 of the bellcranks 62 are urged by respective springs 65 into engagement with the upper edge surface of each of slides 27 and 28 in their actively moved positions.

As explained hereinbefore, each pair of gears 29, 30 is slidably and nonrotatably mounted on ordinal square shafts 38 (Figs. 2, 3 and 4) supported in transverse frame members 16, 17 and 18 and serve in cooperation with respective cylinders 31 and five-toothed sectors 32 to effect incremental rotation of the shafts 38 with each cycle of machine operation. Intermediate members 16 and 17, a spool 71 is slidably and nonrotatably mounted on each shaft 38 and has opposite bevel gears 72, 73 at its ends positioned for cooperation with numeral wheel gear 74 mounted on the lower end of numeral wheel shaft 75 journalled in the frame of carriage 21. Therefore, when gears 72 or 73 are engaged with gears 74, the incremental rotation of shafts 38 will impart a positive or negative rotation to numeral wheels 20, thereby registering a number of increments equal to the value of the depressed keys 26 in the aligned ordinal row of keys.

To control positive or negative registrations in the numeral wheels 20, transverse shaft 76 journalled in side frame members 12 and 13 and auxiliary frame member 15 carries transversely extending strap, or gate, 77 which is positioned between gears 72, 73 so that rocking movement of shaft 76 serves to determine the engagement of gears 72 or 73 with numeral wheel gears 74. Thus, depression of plus key 78 serves in a well-known manner to rock shaft 76 (clockwise in Fig. 2), thereby enabling engagement of gears 72 and 74 and the engagement of the drive clutch and closing of the motor switch to determine a positive registration on numeral wheels 20 of the values set in the keyboard. Similarly, depression of minus key 79 determines a negative registration of such values by effecting engagement of gears 73 with numeral wheel gears 74. Normally, gate 77 maintains gears 72, 73 in the neutral position shown with respect to numeral wheel shaft gears 74 under the control of a conventional centralizing mechanism.

Accumulator transfer mechanism

Figure 6:
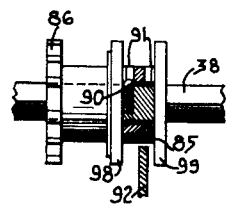
Fig. 6 is a detail of each tens-transfer gear.

Well-known means are provided for effecting a tens-transfer from order to order in the accumulator register when the registration of a numeral wheel changes from "0" to "9" or vice versa. For this purpose, each numeral wheel shaft 75 (Fig. 2) carries a single-tooth gear 82 immediately beneath the frame of carriage 21 in operative relation with the nose of a transfer lever 83 pivoted on the lower surface of the carriage frame. Each lever 83 has an arm extending into the next higher order of the machine which is provided with a depending ear 84 engaging in the annular groove of collar 85 (Figs. 2 and 6) integral with transfer gear 86 slidably and nonrotatably mounted on the next higher order shaft 38. Gear 86 is normally disposed out of the path of the single-tooth actuator 87 therefor. Single-tooth actuator 87 for transfer gear 86 of the higher of each pair of orders is mounted with single-tooth actuator 87-a for the adjacent lower order by studs on locking disks 89, 89-a secured on each actuator shaft 33. When numeral wheel 20 of one order passes from "9" to "0," or vice versa, tooth gear 82 rocks lever 83 which, through depending ear 84, moves gear 86 of the next higher order into the path of the associated transfer actuator 87 or 87-a. Thus, the transferred increment is introduced into the next higher order dial 20 through either gear 72 or 73 depending upon setting of the machine for addition or subtraction. Each of transfer gears 86 is maintained resiliently in either adjusted position thereof by the co-operation of a spring-pressed ball 90 (Fig. 6) in shaft 38 with respective apertures 91 in the collar 85.

Suitable restoring means is provided for the shiftable transfer gears 86 and for this purpose an angular bail 92 extends transversely of the machine and is supported at its ends by similar three-armed levers 93 (Figs. 2, 7 and 12), one of which is pivotally mounted at 94 on a bracket 95 secured on transverse frame member 96 and the other of which is pivotally mounted at 97 on a bracket secured on side frame 13. The upright leg of the bail 92 is disposed between flanges 98 and 99 (Fig. 6) of the collars 85 and is normally positioned adjacent flanges 99 to block forward movement of transfer gears 86 to active position. The horizontally disposed arm 100 of each of three-armed levers 93 is formed at a right angle into a plane parallel with bail 92 and is provided at its end with a roller 101 (Fig. 7). A spring 102 is provided for each of levers 93, being secured at its one end on a stud on a depending arm of lever 93 and at its other end in the framework of the machine, serves to urge each of rollers 101 into engagement with the respective cams 103, 104 secured on the extended end of the No. 1 and No. 6 actuator shafts 33 adjacent the ends thereof. In the full-cycle position of the main clutch, the high point of the cams 103 and 104 is effective to maintain bail 92 in the position shown, thereby preventing forward movement of transfer gears 86. The structural shape of the cams 103 and 104 is such that immediately upon cyclic rotation of actuator shafts 33, bail 92 is rocked forwardly (counter-clockwise, as viewed in Fig. 2) under the urgency of springs 102 to release transfer gears 86 for movement to active position if a tens-transfer should occur in any order of the machine. Similarly, cams 103 and 104 are effective immediately upon completion of each cyclic operation of the machine to simultaneously move any actively positioned transfer gears 86 to their inactive position.

Means are provided for preventing overthrow of the numeral wheels 20 at the end of an actuation thereof and for this purpose there is secured on each square shaft 38 a Geneva wheel having a locking disk cooperating therewith and mounted on the associated actuating shaft 33. As seen in Figs. 2 and 9, each shaft 38 has Geneva wheel 110 mounted thereon for rotation therewith, the hub 111 of wheel being journalled in frame member 17 to support shaft 38. Associated with each Geneva wheel 110 is locking disk 89 for the higher order shaft and 89–a for the lower order shaft of each pair of shafts 38. Each of the disks 89, 89–a is provided with an arcuate portion 113, 113–a, respectively, on the periphery thereof for cooperation with one of the ten concave surfaces of the corresponding Geneva wheel 110 to prevent overthrow of the associated shaft 38 immediately following the incremental rotation thereof by the respective ten-transfer actuators 87, 87–a.

To centralize shafts 38 and Geneva wheels 110 in position after movement thereof, a ten-tooth star wheel 115 (Figs. 2 and 3) is secured on each shaft 38 adjacent transverse frame member 16 for cooperation with a spring-pressed ball (not shown) mounted in bar 116 secured on frame member 16. It will be recalled that in the first part of the digitation phase of each cycle, each five-toothed sector 32 becomes active to enter a value of "5" in the accumulator dials when the selected value to be registered is "5" or greater. In the latter part of the digitation phase of each cycle, each cylinder 31 becomes effective to impart from one to four increments of rotation to the associated shafts 38 when the selected value to be registered is "4" or less or is greater then "5." In approximately 15° following the completion of the digitation phase or after 200° of each cycle, transfer actuator 87 (Figs. 9 and 10) on the right-hand or No. 1 actuator shaft 33 is effective to impart an increment of rotation to the tens order shaft 38 if the transfer gear 86 thereon has been moved to active position, it being understood that no transfer occurs in the units order. It will be seen that the successive pairs of actuators 87, 87–a on the remaining actuating shafts 33 are spaced-apart in angular increments to provide for succesive operation of the transfer actuators from the tens order to the highest order. It will be noted in Figs. 8 and 9 that keyboard values are registered in ten orders of the accumulator register under the control of the five actuator shafts 33 on the right, whereas, a transferred increment may be carried into the eleventh and twelfth orders under the control of the tens-transfer actuators 87, 87–a secured on the No. 6 or left-hand, actuator shaft 33.

*Carriage shift mechanism*

Means are provided for shifting the carriage in either direction from one ordinal position to another by power-driven means controlled by manually operable keys. The power-driven means preferably comprises elements of the actuating means for entering values into the accumulator register. Carriage 21 (Figs. 2 and 11) is provided with rack 120 extending along the rear side thereof with its ends suitably supported on the frame of the carriage. Rack 120 has a plurality of vertical slots 121 in the lower edge thereof spaced-apart a distance equal to the ordinal spacing of the machine. The end slots for the rack are formed in respective yieldable pawls 122, 123 having respective springs 124 associated therewith. Pawls 122 and 123 serve upon movement of carriage 21 to one end position or the other to terminate the operation of the shifting mechanism, as will be hereinafter described. The slots 121 are adapted for engagement by coacting pins 125 which are symmetrically disposed in quadrature arrangement on the carriage shift drive disk 126 secured on the hub of shift gear 127 which is journalled on a stub shaft 128 secured in transverse frame member 16 and auxiliary bearing plate 129. Thus, a 90° rotation of shift gear 127 and therefore disk 126 serves to move rack 120 and carriage 21 to effect a one ordinal step movement of the carriage laterally of the machine. In order to rotate shift gear 127 selectively in either direction the two right-hand actuating shafts 33 (Fig. 12) are extended and are provided with similar controllable drive connections with gear 127. Each connection includes shift clutch drivers 130 which are pivotally connected to the ends of the adjacent shafts 33 in such a manner as to form a readily controllable clutching and declutching engagement with the associated clutch follower assemblies 131 on the respective gear sleeves 132, 133 which are journalled in transverse frame member 16 and auxiliary bearing plate 129 (Figs. 11 and 12). The gear on sleeve 132 is axially offset from the gear on sleeve 133 and is enmeshed with a relatively wide idler gear 134 suitably journalled on the frame of the machine. Gear 134 is, in turn, enmeshed with gear 135 forming part of the compound gear assembly which includes smaller concentric gear 136 adapted to mesh with shift gear 127 and mounted for rotation on stub shaft 137 secured in transverse frame member 16 and auxiliary bearing plate 129. The gear of gear sleeve 133 is meshed directly with gear 135 to control rotation of shift gear 127 in a direction opposite to that controlled by gear sleeve 132. Thus, rotation of the gear sleeves 132, 133 in a clockwise direction, as viewed in Fig. 11, causes shifting of the carriage 21 to the left and to the right, respectively, of the calculating machine.

Similar mechanisms are provided to selectively control the drive connection between clutch drivers 130 on the ends of actuator shafts 33 with clutch follower assemblies 131. Each mechanism includes a clutch controller 138 at the rear end of respective push rods 139, 140 adapted to coact with the associated shift clutch driver 130 so that upon rearward movement of either push rod 139 or 140 the associated drive connection is established in the manner described in Patent No. 2,636,678, issued to M. P. Matthew, April 28, 1953. Each of the rods 139, 140 is suitably mounted on the frame for endwise movement and is spring-urged to the position shown in Fig. 12 by respective springs 141 and 142. To control the rearward movement of the right shift push rod 139, arm 143 is pivotally mounted on shaft 144 supported in the framework of the machine and carries pin 145 at its lower end interposed between the end of the push rod 139 and the shoulder of a notch in pusher link 146 pivotally mounted at its end on depending arm 147 secured on one end of sleeve 148 rockably mounted on shaft 144. At its other end sleeve 148 carries an extended arm 149 for control by the right shift key 150 (Fig. 1). The depression of either shift key 150 or 151 serves not only to enable the associated drive connection, but to engage the clutch and energize the motor circuit in a well-known manner. To effect a left shift operation, depending arm 152 is pinned on shaft 144 and has a pivotal connection at its lower end with pusher link 153 (Figs. 12 and 13) which is provided with a notch in the free end thereof, the shoulder of which is normally urged by spring 154 into engagement with laterally extended pin 155 carried by arm 157 and abutting the forward end of the left shift push rod 140. Shaft 144 carries arm 156 for control by the left shift key 151 to initiate a shift operation in a conventional manner. Depending arm 157 is secured on one end of sleeve 158 rockably mounted on shaft 144, which sleeve at its other end carries arm 159 having pin 160 thereon engaged by the notched free end of pusher link 161 for a purpose now to be described.

Figure 13:
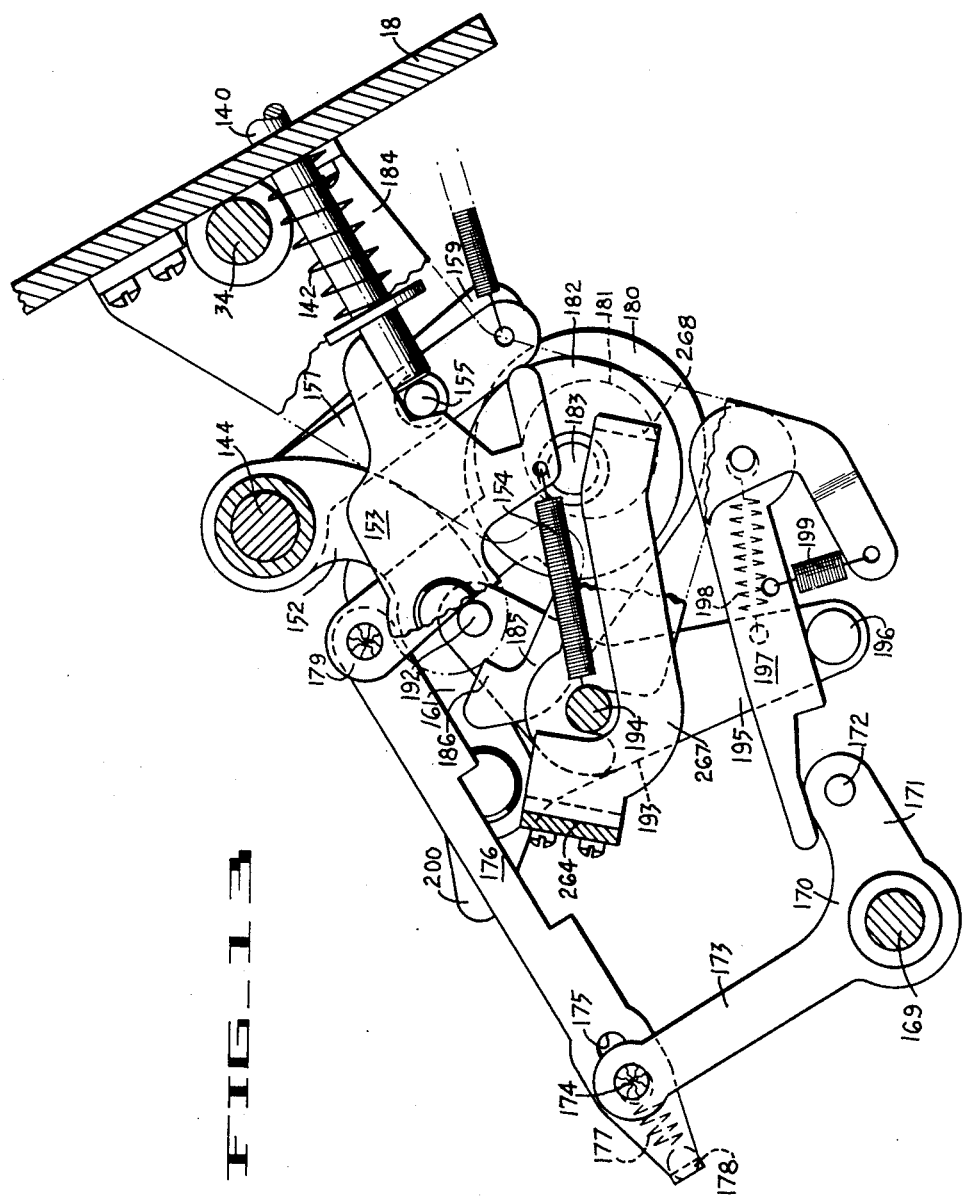
Fig. 13 is an enlarged elevational view of the left shift and resetting control unit, the view being taken along the planes indicated by the lines 13—13 in Fig. 12.

In addition to the control by the left shift key 151 for ordinal shifting operations, a left carriage shift operation may be effected by power means in plural order operations of the machine. A depression of any one of the multiplication control keys 166, 167 or 168, for example, serves by means to be described hereinafter, to impart a clockwise rocking movement to shaft 169 (Figs. 12 and 13). Bellcrank 170 pinned to shaft 169 intermediate its ends has a lower arm 171 which is provided with stud 172 for a purpose to be later described, and a vertical arm 173 which is provided with stud 174 at its upper end. Stud 174 is embraced in slot 175 in one end of link 176 with one end of spring 177 supported on stud 174 and the other end carried by ear 178 on the adjacent end of link 176 normally urging link 176 to the right, as viewed in Fig. 13. The other end of link 176 is pivotally mounted on the upper end of arm 179 of hook member 180 rotatably mounted on eccentric 181 secured between similar disks 182 on shaft 183 journalled at its one end in bracket 184 secured on transverse frame member 18 and at its other end in auxiliary side frame member 64. The eccentrically controlled member 180 also carries arm 185, the outer end of which is provided with a hook 186.

Shaft 183 is connected at its left end (Fig. 12) by means of bevel gears 190 to shaft 191 which, in turn, is connected by bevel gears 189 (Fig. 15) to main drive shaft 34. By this means the shaft 183 is driven in synchronism with the main drive shaft. It is thus obvious that the hook member 180 continuously rocks on its eccentric mounting in synchronism with the main drive shaft whenever the main clutch is engaged and the motor is energized.

Normally, hook member 180 is ineffectively operated with the rotation of shaft 183 and eccentric 181. However, upon clockwise rocking movement of shaft 169, which is also effective to engage the main clutch and energize the motor in a well-known manner, spring 177 urges link 176 to the right, as viewed in Fig. 13, to position the face of the hook 186 against pin 192 on one arm of bellcrank 193 secured on transverse shaft 194 journalled in side frame member 12 and auxiliary frame member 64. Depending arm 195 of bellcrank 193 is provided at its lower end with pin 196 for engagement with the shoulder of the notch in the free end of latch lever 197 upon clockwise rocking movement of bellcrank 193. Thus, it can be seen, that upon initiation of an operation, hook 186 is moved into position relative to pin 192 for engagement therewith after 180° of the operating cycle, whereupon hook 186 engages pin 192 to rock bellcrank 193 clockwise against the urgency of the relatively strong spring 198. In the rocked position of bellcrank 193, spring 199 urges latch lever 197 counterclockwise to engage the notch therein with the pin 196 on bellcrank 193 for the duration of the operation. As the bellcrank 193 is latched in its rocked position by lever 197, the hook 186 is thereafter disengaged therefrom. To initiate a left shift operation, arm 200 secured on shaft 194 has a pivotal connection with pusher link 161 (Fig. 12) so that, upon clockwise rocking movement of shaft 194, link 161 is moved rearwardly to impart movement to arms 159 and 157, thereby moving left shift push rod 140 rearwardly to effect engagement of the clutch driver 130 with the clutch follower 131 in the second cycle of operation. It will be noted that eccentric 181 is effective in 180° of the first machine cycle to condition the left shift clutch for engagement, which engagement takes place immediately in the second machine cycle.

The carriage is positively arrested in any ordinally shifted position thereof upon release of either of shift keys 150 or 151 or immediately following the termination of a left shift operation controlled by the power means described above. It will be recalled that upon initiation of a shifting operation, the corresponding clutch driver 130 is engaged with its associated follower 131 and the main clutch is engaged and the motor switch is closed so that the carriage 21 is shifted laterally in either direction as desired. The clutch controllers 138 on the rearward end of respective push rods 139 and 140 are each provided with similar depending ears 206 (Figs. 11 and 12) which lie directly in front of similar shift pins 207 and 208 slidably mounted in rocker plates 209 and normally spring-urged forwardly for engagement by either of ears 206 upon movement of respective push rods 139 or 140 to operative position. In the normally retracted position of the shift control pins 207, 208 the outer ends thereof are disposed out of the operative range of the respective shift locking levers 210 and 211, each of which is rockably mounted on bearing plate 129. Rocker plates 209 are secured together in spaced-apart relation and as a unit are pivotally mounted on bearing plate 129 and are normally urged counter-clockwise by spring 212 to maintain spacer pin 213 in engagement with cam 214 secured on the rearwardly extended end of one of the actuator shafts 33. Disk 126 is provided with four nodes 215 equally spaced on the periphery thereof so that, in each ordinally shifted position of the carriage 21, the diametrically opposed nodes are in position for engagement with the substantially square ends of the locking levers 210 and 211 which are normally urged to active position by spring 216. Upon initiation of a shifting operation one or the other of the levers 210, 211 is released from engagement with the associated node 215, thereby permitting rotation of disk 126 to move the carriage 21 in the selected direction. Upon rearward movement of push rod 139 or 140, the respective pin 207 or 208 is moved outwardly, so that immediately upon rotation of cam 214 to rock rocker plates 209 (clockwise in Fig. 11), the actively positioned pin 207 or 208 is effective to rock the corresponding lever 210 or 211 (counterclockwise or clockwise, respectively) against the urgency of the spring 216. Immediately following approximately 90° rotation of cam 214, rocker plates 209 are urged to the normally inactive position by spring 212 and spring 216 urges levers 210 and 211 into position for re-engagement with the diametrically opposed nodes 215 in the ordinally shifted position of the carriage 21. Simultaneously with the release of push rod 139 or 140, respective pins 207, 208 are retracted to their normally inactive position.

*Resetting mechanism*

Means are provided for restoring the machine to normal condition between successive operations by shifting the carriage to the leftmost position, as viewed from the front of the machine, and by then effecting zero resetting of either the accumulator or the revolutions counter, or both of these registers as determined by settable control means, the operation being carried out by power-driven means under control of a manually operable register return and resetting key 220. This mechanism is generally of the type disclosed in the patent to Carl M. Friden, No. 2,294,083, which was issued August 25, 1943.

Return and resetting key 220 (Fig. 1) operates in a well-known manner to impart clockwise rotation to shaft 169 (Figs. 12, 13 and 14) and to engage the main clutch and close the motor switch. The clockwise rocking of shaft 169 serves not only to effect an engagement of the left shift clutch, as described supra, but to also effect operation of the resetting mechanism. Shaft 194, which is rocked clockwise, as viewed in Figs. 13 and 14, by eccentrically controlled member 180, carries arm 221 having a pivotal connection at its upper end with pusher link 222, the notch in the free end of which is normally urged by spring 223 into engagement with the forward end of push rod 224 which is mounted for endwise movement in the frame of the machine and is normally urged forwardly thereof by spring 225. At its rearward end push rod 224 carries resetting clutch controller 226 (Fig. 12) slidably mounted thereon and normally urged by spring 227 into engagement with a keeper on the end of the rod. Clutch controller 226 is held against rotation on shaft 224 and is guided in its rearward movement by the engagement of pin 228 on transverse frame member 16 with an aperture of slightly larger diameter in controller 226. The rearward movement of clutch controller 226 positions clutch driver 234 pivotally mounted on the rearward end of the No. 5 actuator shaft 33 for engagement with clutch follower 235 which is secured on hub 236 journalled in transverse frame member 16 and bearing plate 237. Hub 236 also carries cam 238 positioned adjacent transverse frame member 16. The organization of the resetting clutch assembly is identical to that of each of the shift clutch assemblies. Associated with cam 238 is lever 239 (Fig. 11) pivoted at 240 on transverse frame member 16. Intermediate its ends, lever 239 is provided with roller 241 normally maintained in engagement with cam 238 under the influence of spring 242.

The upper end of lever 239 is positioned for cooperation with pin 243 on bracket 244 depending from resetting drive member comprising slide 245 when the carriage 21 is in its left end position, as illustrated in Fig. 11. Slide 245 has an L-shaped cross section and is mounted for endwise sliding movement on carriage 21 by studs 246 engaged in slots in the slide 245. Spring 247 normally urges slide 245 to the inoperative position shown. Reciprocation of slide 245 may be utilized in a manner well-known in the art to reset either or both of the registers in accordance with the adjustments of the manually settable knobs 248 and 249 (Fig. 1).

Normally, following the engagement of the clutch driver 234 with clutch follower 235, cam 238 would be effective to rock lever 239 to-and-fro against the urgency of the spring 242 until such time as the carriage 21 has reached its left end position, whereupon lever 239 would engage pin 243 to move slide 245 to the right (to the left as viewed in Fig. 11). However, means are provided whereby the engagement of the clutch driver 234 with the clutch follower 235 is delayed until immediately prior to the last ordinal shift of the carriage to the left. For this purpose bellcrank 250 is pivotally mounted at 251 on bearing plate 237, having the vertical arm thereof disposed in the path of pin 252 on shift rack 120. The lower end of the depending arm of bellcrank 250 is provided with an inverted T-shaped portion 253 formed at right angles thereto and extending forwardly of the machine beneath bearing plate 237 and transverse frame member 16 to a position directly in front of depending ear 254 of clutch controller 226. When the carriage 21 is in any ordinal position other than the left end position, spring 255 serves to maintain T-shaped extension 253 immediately in front of depending ear 254, thereby blocking movement of controller 226 to clutch-engaging position. The movement of bellcrank 250 under the influence of spring 255 is limited by the engagement of the upper edge of the horizontal extension of T-shaped portion 253 with the lower edge of the transverse frame member 16. The vertical extension of T-shaped portion 253 is positioned between bearing plate 237 and transverse frame member 16 and serves to prevent any deformation of the lower arm of bellcrank 250 upon rearward movement of push rod 224 and the compression of spring 227 (Fig. 12) when bellcrank 250 is in its blocking position. It can be seen, therefore, that when resetting push rod 224 is moved rearwardly and the carriage 21 is out of its left end position, spring 227 is compressed and clutch controller 226 remains in its inoperative position. However, immediately upon movement of the carriage 21 into its leftmost position, pin 252 engages the upwardly extended arm of bellcrank 250 to rock it (clockwise in Fig. 11) and thereby move portion 253 out of blocking relation with respect to depending ear 254 of clutch controller 226, whereupon spring 227 is effective under compression to immediately move controller 226 rearwardly to effect engagement of the clutch driver 234 with the clutch follower 235. During approximately 270° of the following machine cycle, cam 238 rocks lever 239 (counter-clockwise in Fig. 11) to cause a reciprocation of the resetting slide 245.

Key 220 (Fig. 1) may be latched in depressed position during shifting of the carriage to its end position if displaced therefrom. This latch is released and the left shift and resetting operation terminated by conventional means under control of over-ride pawl 122 during the first cycle of operation of the actuating means when the carriage is in said end position. For this purpose slide 260 (Figs. 11 and 12) is mounted for endwise movement on transverse frame member 16 for operation by pawl 122 upon oscillation thereof by shift pins 125. Slide 260 overlies an arm of bellcrank 261 pivoted on shaft 76 and pivotally connected to link 262, which is also pivotally connected at its forward end to one arm 263 (Fig. 12) of bail 264 mounted for counter-clockwise rocking movement on shaft 194, as viewed in Fig. 13. The other arm 265 of bail 264 extends rearwardly and is provided with a lateral extension 266 underlying left shift pusher arm 161 and resetting pusher arm 222. The third arm 267 is secured on bail 264 intermediate the ends thereof and at its free end is provided with a lateral extension 268 underlying left shift pusher arm 153, as seen in Fig. 13. Thus, it can be seen, that upon counter-clockwise rocking of override pawl 122 (Fig. 11) slide 260 is moved downwardly and through bellcrank 261 moves link 262 forwardly, as viewed in Fig. 12, imparting a counter-clockwise rotation to the bail 264 and thereby rocking pusher arms 153, 161 and 222 out of engagement with respective push rods 140, 224 and pin 160 to terminate the left shift and zero resetting operations.

A right shift operation is terminated in a similar manner when in the rightmost position of the carriage 21, override pawl 123 is rocked clockwise to release right shift pusher link 146 from its engagement with the forward end of push rod 139, whereby releasing the rod to the influence of its spring 141. With the carriage 21 in its extreme right end position, as viewed from the front of the machine (to the extreme left in Fig. 11), the left-hand arm of pawl 123 overlies pin 272 on arm 273 pivoted at 274 on bearing plate 237. Adjacent pivot 274, arm 273 carries pin 275 abutting a projection 276 of bellcrank 277, also pivoted on bearing plate 237. The lower end of depending arm 278 of bellcrank 277 underlies pin 279 on the lateral extension 280 of lever 281 rockably mounted on shaft 76 and having a pin 282 (Fig. 12) at its forward end engaged in a slot in the rearward end of lever 283 pivoted on a bracket on transverse frame member 18 and provided at its forward end with a lateral extension 284 underlying right shift pusher arm 146. The horizontal arm of bellcrank 277 overlies pin 285 on the formed-over end of lever 286 pivotally mounted on the depending portion of bearing plate 237. Pin 285 supports one end of spring 287, the other end of which is secured on an ear on the depending arm of bellcrank 250 and serves to maintain bellcrank 277 and arm 273 in the position shown in Fig. 11.

*Multiplier keyboard*

The selection mechanism for the multiplier factor is of the type disclosed in said Patent No. 2,399,917. Generally, such a mechanism comprises a ten-key keyboard including keys 292 (Figs. 1 and 15) and a pin carriage 293 associated therewith. Conventionally such a pin carriage has ten ordinal rows of settable stop pins 294 and ten ordinal differentially adjustable elements 295 in the form of racks in which digits of the multiplier factor may be set successively for subsequent control of the multiplying operation. In order to set up the multiplier digits, each pin row includes eight pins 294 corresponding to the "1" to "8" keys and a fixed stop corresponding to the "9" key, so that a depressed multiplier key operates through an associated selection lever 296 to set the corresponding pin of an aligned ordinal row to active, or raised, position. At the same time that a pin of the pin carriage is moved to active position, the aligned rack is released to move into engagement with the pin and thereby be set differentially in accordance with the value of the depressed key. Subsequently, the depressed key operates a conventional escapement mechanism (not shown) to move the pin carriage one ordinal step with respect to the keyboard selection mechanism. In this manner the multiplier digits are set up in the multiplier selection mechanism, the setting operation beginning with the highest order digit of the multiplier in the embodiment illustrated. As seen in Fig. 1, a setting has been made corresponding to three successive depressions of the zero key 292.

To release the aligned rack 295, the depression of a factor key 292 operates through lever 297 (Fig. 15), link 298 and lever 299 to impart a clockwise rocking movement to the associated latch pawl 300, thereby moving it out of engagement with the aligned rack 295. Pawls 300 are carried by shaft 301 supported between similar pin carriage frame plates 302 and are spring-urged to the active position shown. A series of sensing pawls 306, one for each of rack sectors 295, are also rockably mounted on shaft 301 adjacent each corresponding latching pawl 300 and are provided with a camming surface 307 which is normally maintained in engagement with a roller 308 on the associated rack sector 295 by a spring 309 for a purpose to be hereinafter described.

*Multiplier rack restoring means*

The differentially adjusted positions of racks 295 are utilized to control the number of registrations of the multiplicand in the accumulator and to control the shifting of the accumulator from left to right after multiplication by each multiplier digit, thereby enabling correct registration of the next ordinal product as well as to shift the pin carriage so that the next higher order rack 295 comes into controlling position with respect to the operation of the machine. To enable exercise of the above control, means is provided for returning each adjusted rack to its initial position, this operation being successive from the adjusted rack of lowest order, with the shifting of the accumulator and the multiplier pin carriage following the last step of movement of each rack to condition the machine for operation in the next higher order.

The operating mechanism for the racks comprises a feed pawl 314 (Figs. 15 and 16) which is pivotally secured at 315 on the end of an arm 316 pivoted at 317 on the frame. Pawl 314 is urged in a counter-clockwise direction, as viewed in Fig. 15, by spring 318 which is attached at one end to the lug on pawl 314 and at its other end on a pin on arm 316. Pawl 314 is held in inactive position by its upward extension 319 engaging behind holding pawl 320 which is secured on the end of shaft 321 suitably pivoted in the framework of the machine and is maintained inactive until the multiplying operation is started, the inactive position being shown in Fig. 15.

In order to actuate pawl 314, arm 316 (Figs. 15 and 16) is pivotally connected to pitman 322 which is engaged with an eccentric cam 323 secured on main drive shaft 34 between similar disks 324. Pitman 322, arm 316 and pawl 314 are reciprocated once for each cycle of rotation of drive shaft 34 and the operation of the pawl 314 in its active direction occurs at the beginning of each cycle. However, the pawl 314 is held in inactive position until holding pawl 320 is allowed to move in a counter-clockwise direction from the position shown in Fig. 15 by oscillation of shaft 321. It will be noted that for each cycle of machine operation, actuator pawl 314 restores rack 295 in biunial step-by-step fashion when the rack has been set to represent a digit of "2" or more, i.e., the rack will be restored two steps for each reciprocation of pawl 314. If the rack sector 295 has been adjusted to represent "1," pawl 314 becomes effective after 90° of the cycle to restore the sector to its normal "0" position. For example, if the aligned rack 295 has been differentially set to represent "5," actuator 314 will restore rack sector 295 to its "3" position in the first cycle; followed by a restoration to the "1" position in the second cycle, and in the third cycle will be effective to restore the rack one step to its "0" position, thereby requiring three cycles of the machine for a "5" adjustment of the rack sector. It can be seen, therefore, that the number of machine cycles required to control an ordinal multiplication operation when the active sector is adjusted to "3," "5," "7" or "9" is slightly greater than half of the represented digit. On the other hand, a digit of "2," "4," "6" or "8" reduces the ordinal cyclic control of a multiplication operation by half.

*Multiplication keys*

The conditioning of the machine for the multiplying operation as controlled by the multiplication control keys will now be described. When one of keys 166, 167 or 168 is depressed and latched in depressed position, several functions of the machine are set into operation selectively in accordance with the type of operation determined by the key depressed. These functions include enabling of the control which determines the sign character of the registration of the product, enabling of the power set means for operating the sign character control, enabling of the carriage shift mechanism to determine return of the carriage to an end position, selective enabling of the resetting mechanism for the accumulator and the revolutions counter, setting the control for enabling feed pawl 314 for the multiplier racks, engaging the clutch and enabling the motor circuit. The mechanisms performing these functions and their relation to multiplication keys 166, 167 and 168 will now be described briefly. For a more complete description reference is to be had to the afore-mentioned Patent No. 2,399,917.

Keys 167 and 168 (Fig. 17) are mounted for endwise sliding movement in respective keyboard plates 330 and are urged to raised position by respective springs 331 similarly to that of key 166, as seen in Fig. 14. Each of keys 167 and 168 is provided with a latching tooth, similar also to that of key 166 (Fig. 14), which becomes engaged, upon depression thereof, by a single latching tooth on the corresponding one of similar latch levers 332 secured on transverse shaft 333 which is suitably journalled in vertical frame plates 14 and 64. Each of latch levers 332 is urged in a clockwise direction, as viewed in Fig. 14, by spring 334. The lower end of the latch lever 332 associated with keys 167 and 168 is also operatively related with an arm of bellcrank 335 (Fig. 15) whereby the latch for a depressed key 166, 167 or 168 can be released to terminate a multiplying operation in a well-known manner.

*Registration sign character control*

Means are provided under control of the multiplication control keys for selecting the sign character of the registration of the product in the accumulator to be positive if keys 166 and 167 are depressed and to be negative if key 168 is depressed, such means being enabled by depression of a selected key and subsequently operated by power means also enabled by depression of the key. Pins 340 (Fig. 17) of keys 167 and 168 extend through the adjacent frame plate and engage in respective slots in the forward ends of levers 341 and 342, respectively, which are offset laterally intermediate their ends to extend beyond the adjacent plate 14 and have their hubs pivoted on shaft 343.

Lever 341 (Figs. 17 and 18) carries pin 344 at its rearward end engaging a square aperture in arm 345 pivotally mounted at 346. Arm 345 is connected by spring 347 with positive setting arm 348 pivoted at 349 on power-setting bellcrank 350 which is pivoted at 351 on left frame plate 14. Arm 348 is urged upwardly by spring 347 into engagement with roller 352 on arm 345 so that, in effect, arms 345 and 348 move with lever 341 upon depression of key 167. At its rearward upwardly offset end, arm 348 has a notch therein for engagement with pin 353 at the upper end of lever 354 secured on the outer end of plus-minus gate shaft 76 whose rocking movement, as previously described, moves gate 77 to control the engagement of the plus-minus gears with the numeral wheel gears and therefore controls the sign character of the registration.

Normally the notched end of positive setting lever 348 is maintained below pin 353 by virtue of the engagement of the lever with pin 358 on lever 359 pivoted at 360 on the frame and having ear 361 overlying stop 362 on pin carriage 293 or the active rack 295 in any shifted position of the carriage. Therefore, unless a value is set into the pin carriage, the depression of multiplication control key 167 will not effect an engagement of arm 348 with the pin 353.

The rearward end of lever 342 is identical in form to that of lever 341 and carries a similar pin 344 overlying and maintained in engagement with negative setting arm 363 by spring 364 (Fig. 18). Setting arm 363 is pivotally connected at 349 to actuating bellcrank 350 and has a downwardly offset notched end for engagement with pin 365 at the lower end of lever 354. Arm 363 also has an upward extension engaging pin 358 on lever 359 which serves to control the engagement and disengagement of the notched end of arm 363 with pin 365 subsequent to the operation of the lever 342.

Following the entry of a multiplier factor into the pin carriage 293, a depression of control key 167 or 168 becomes effective to engage either arm 348 or 363 with respective pins 353 or 365, whereby, upon subsequent counter-clockwise movement of bellcrank 350, arm 348 or 363 will be moved to mesh the plus gears or minus gears, respectively, with the numeral wheel gears. Thus, the control mechanism is conditioned to determine a positive or a negative registration of the product in the accumulator.

A depression of multiplication control key 166 operates in a well-known manner through linkage (not shown) to impart a counter-clockwise movement to bellcrank 369 (Fig. 17) about its pivot 370 on side frame 14, and, through link 371, rocks arm 345 clockwise to effect an engagement of positive setting arm 348 with pin 353 as described above in connection with key 167.

Thus, it can be seen that each of keys 166, 167 and 168 controls the setting of linkage which, in turn, will cause setting of the plus-minus gears upon oscillation of power-setting bellcrank 350. To effect operation of setting bellcrank 350, a roller 372 (Fig. 18) thereon cooperates with setting cam 373 which is slidably and non-rotatably mounted on drive shaft 34 by a suitable slidable driving connection. Cam 373 is normally spring-urged to an inactive position with respect to roller 372 but may be moved to active position with the rocking of lever 374 (Fig. 17) about its pivot 375 on left side frame 14. The upper end of lever 374 is provided with roller 376 in engagement with cam 373 and at its lower end is provided with a cam surface engaging roller 377 carried at the rearward end of power-setting lever 378 pivoted at 379 on side frame 14. Bellcrank 381 secured on shaft 382 is normally urged counter-clockwise (in Fig. 17) by spring 380 and through pivotal connection 383 with lever 378 urges lever 378 in a clockwise direction. Lever 378 is normally held against clockwise movement by the engagement of an offset ear 384 overlying the upper arm of bellcrank 385 pivoted at 386 on side frame 14 which is urged into latching position by spring 387. Lever 388 pivoted at 389 on side frame 14 has a pivotal connection at its forward end with bellcrank 381 and at its rearward end carries pin 390 engaged in a slot adjacent the lower end of link 391. Spring 402 normally serves to maintain the lower end of the slot in link 391 in engagement with the pin 390 on lever 388. The angular disposition of link 391 with lever 359 is such that the engagement of the bifurcation in the end of the link with pin 403 on lever 359 tends to urge lever 359 (clockwise in Fig. 17) to the position shown in Fig. 17 with the lever 378 in its latched position. Simultaneously with the release of lever 378 and the clockwise rocking movement thereof under the influence of spring 380, spring 402 becomes effective through link 391 to raise pin 358, thereby enabling the engagement of arm 348 or 363 with respective pins 353 or 365.

To release latching bellcrank 385, U-shaped lever 392 secured on shaft 393 is provided with pin 394 overlying the horizontal arm of bellcrank 385 and roller 395 underlying a portion of levers 341 and 342 and an extension 396 of lever 378. Therefore, a depression of key 167 or 168 rocks U-shaped member 392 to remove the vertical arm of bellcrank 385 from beneath the ear 384 on lever 378. However, this merely conditions the lever 378 for operation as it is still maintained inoperative by the engagement of latch lever 397 with roller 398. Lever 397 is secured on the end of shaft 400 and is urged in a clockwise direction by spring 399. To release latch lever 385 from the key 166, U-shaped lever 392 is rocked through shaft 393 by arm 401 (Fig. 14).

As explained hereinafter, shaft 400 (Fig. 17) and therefore latch lever 397 are oscillated at the end of the carriage shifting or carriage shifting and resetting operation to disable latch pawl 397 and enable the power-setting operation. At the end of the carriage shifting, or carriage shifting and resetting operation, the power-setting bellcrank 350 (Fig. 18) is moved to active position and means are provided for latching said bellcrank and the plus-minus gears controlled thereby in active position. Such means may comprise latch lever 405 pivoted at 406 on auxiliary frame plate 15 and urged in a counter-clockwise direction by spring 407. Latch lever 405 is notched at its lower end for engagement with square stud 408 on one arm of bellcrank 350. Thus, the bellcrank 350 may be latched in active position when its lower end is moved away from the stop 409. Upon engagement of the notch in lever 405 with stud 408, roller 410 carried by a lateral extension of lever 405 is rocked into engagement with the rearward end of arm 411 to effect a release of the latch arm in a manner later to be described.

*Carriage return and resetting control*

Upon depression of either of multiplication operation control keys 167 or 168, means are brought into play to first determine shifting of the carriage to its left end position as a preliminary to the multiplying operation. Where a resetting operation is desired, key 166 is depressed and a return and resetting operation is performed to selectively zeroize the accumulator, the counter, or both, in accordance with the adjustment of the resetting mechanism.

Key 166 (Fig. 14) carries roller 412 engaged in a slot in the forward end of lever 413 pivoted at 414 on frame member 64 and having pin 415 engaging the upper end of arm 416 secured on shaft 169. The depression of key 166 serves, therefore, through lever 413 to impart a clockwise movement to arm 416 and shaft 169. It will be recalled that a clockwise rocking movement of shaft 169 serves to effect an engagement of the left shift clutch and the resetting clutch, each of which operations become effective in the second machine cycle to shift the carriage to its left end position and to zeroize the accumulator, respectively. Oscillation of shaft 169 also effects an engagement of the main drive clutch and energization of the motor, as explained hereinbefore.

Following the shifting operation of the carriage to its left end position and during the resetting operation, override pawl 122 (Fig. 11) will be operated to move slide 260 downwardly and through bellcrank 261 to move link 262 forwardly of the machine as viewed in Fig. 12, rocking bail 264 and therefore arm 265 and its extension 266 and arm 267 counter-clockwise (Figs. 13 and 14) to terminate the left shift operation and the resetting operation. Extension 266 of arm 265 underlying the horizontal arm of lever 420 rocks the lever 420 about its pivotal mounting on shaft 194. Pin 421 on the depending arm of lever 420 is normally engaged in a notch in the lower edge of link 422 pivotally mounted at 423 on arm 424 secured on shaft 400, so that the rocking movement of lever 420 (counter-clockwise in Fig. 14) by bail 264 moves link 422 to the right to impart a clockwise rocking movement to shaft 400. It will be recalled that the rocking of the shaft 400 in a clockwise direction in Fig. 14, or counter-clockwise direction, as viewed in Fig. 17, moves latch 397 out of engagement with pin 398 to release power-setting lever 378 to the urgency of spring 380, thereby initiating a multiplication operation.

Keys 167 and 168 (Fig. 17) operate generally in the same manner to initiate the multiplying operation with the return of the carriage to its left end position. The respective levers 341 and 342 operated by keys 167 and 168 overlie roller 425 carried by the forward end of lever 426 pivotally mounted on shaft 343. The lower end of depending arm 427 of lever 426 overlies pin 428 on arm 429 secured on shaft 169, so that upon downward movement of lever 426, shaft 169 is rocked counter-clockwise to initiate a left carriage shifting operation and to normally effect operation of the resetting mechanism. However, the resetting mechanism is rendered inactive so that the amount entered is cumulative to the amounts in the accumulator and the counter. Lever 426 also carries pin 430 engaged in a slot in the upper end of link 431 pivotally connected at its lower end on arm 434 secured on the outer end of shaft 435. Referring to Fig. 14, arm 436 secured on the other end of shaft 435 carries pin 437 abutting the lower end of one arm of lever 438 rockably mounted on shaft 194, the other arm of which is provided with ear 439 formed at right angles thereto to underlie resetting pusher link 222. Substantially simultaneously, with the initiation of a left shift operation upon depression of keys 167 or 168, link 431 rocks arm 434 and shaft 435 (Fig. 17) to impart a clockwise rotation to arm 436 (Fig. 14) which is effective through lever 438 to rock resetting pusher link 222 out of engagement with the end of the pusher rod 224, thereby preventing engagement of the resetting clutch.

From the above it is seen that either of the multiplication keys 167 or 168 will initiate operation of the machine to return the carriage to its left end position without a resetting operation in the override cycle. However, during the override cycle with the carriage in its left end position, pawl 122 operates to initiate the multiplication operation in the same manner as described in connection with key 166.

Multiplier feed enabling mechanism

About the time the power-setting operation of the plus-minus gears is effected, the feed pawl for the racks of the pin carriage is also enabled. To enable the feed pawl 314 by release of the holding pawl 320, shaft 321 (Figs. 15 and 17) upon which holding pawl 320 is mounted, carries arm 445 having pin 446 engaging in the slotted end of link 447 pivotally connected by pin 383 to lever 378 for movement therewith. Spring 448, secured at its one end on a stud on frame 14 and at its other end on pin 446, constantly urges arm 445 and shaft 321 clockwise to move holding pawl 320 to its operative position (in a counter-clockwise direction as viewed in Fig. 15). Therefore, upon release and operation of power-setting lever 378 the upward movement of link 447 releases arm 445 and shaft 321 to the urgency of spring 448, thereby permitting the counter-clockwise movement of feed pawl 314 under the urgency of spring 318 to move into engagement with the aligned rack 295.

Accumulator and pin carriage shift control

As explained hereinbefore, irrespective of which key 166, 167 or 168 is depressed, after the initial carriage return or carriage return and resetting operation, the multiplying operation proceeds in the same manner once it is enabled by the overstroke of the shift mechanism upon return of the carriage to the left end position. It will be recalled that upon such overstroke the power-setting means for the plus-minus gears is rendered operable to condition the selection mechanism for positive or negative registrations in the accumulator, and feed pawl 314 is moved to active position with respect to the aligned rack 295 to return the rack a single step to its "0" position or a combination of two steps, that is, bi-incrementally for each machine cycle, in accordance with the adjustment of the active rack.

Upon movement of the active rack 295 to its "0" position and with a positive registration, the rack engages ear 361 (Figs. 15, 17 and 18) to rock lever 359 and pin 358, overlying the upper end of positive setting arm 348, moving arm 348 out of engagement with pin 353 to allow the lever 354, shaft 76 and the plus-minus gears to restore to their neutral position under control of the usual centralizing means, which operation is followed by a shifting operation. This release is effected before completion of the registering operation, but lever 354, shaft 76 and the plus-minus gears are held in engagement until the end of the last registering cycle by a conventional form of cycle lock (not shown). With the rocking of lever 359 to disengage arm 348 from pin 353, link 391 (Fig. 17) is moved downwardly to tension spring 402, thereby enabling the spring 402 to restore lever 359 and arm 348 to their active position if a value other than "0" is registered in the next active rack segment 295. If a negative multiplying operation is in progress, the rocking of lever 359 functions in exactly the same manner through pin 358 to move negative setting arm 363 out of engagement with the corresponding pin 365 on lever 354, thereby enabling the return of the plus-minus gears to their neutral position. The counter-clockwise rocking movement of lever 359 also serves through link 450 (Fig. 18) to lower the hook of arm 451 pivoted on arm 452 adjacent the upper end thereof. Arm 451 is constantly reciprocated during multiplication by the pin 453, carried by cam 373 on shaft 34, engaging the upper extremity of arm 452 pivotally mounted on transverse shaft 455. Upon lowering of arm 451, the hooked end thereof engages pin 456 on latch pawl 457 pivoted at 458 in the framework of the machine and normally serving to latch arm 411 secured on shaft 455 in the position shown in Fig. 18. The free end of arm 411 is connected by link 459 with centralizing lever 460 pivoted on stub shaft 461 supported in the framework of the machine and having slotted end 462 for engagement with pin 365 of the lever 354, so that during the shift cycle the lever 354, shaft 76 and plus-minus gears are positively held in their centralized position where they are moved by the well-known form of centralizing mechanism.

The release of arm 411 rocks shaft 455 and through arm 466 secured thereon, link 467, and arm 468, rocks shaft 321 carrying holding pawl 320, thereby moving feed pawl 314 to the inactive position during a shifting cycle. The rocking of shaft 455 also serves to engage the right shift mechanism and for this purpose has arm 469 (Fig. 12) rockably mounted for sliding movement thereon. Arm 469 is normally positioned to the right of pin 145 which is in engagement with the forward end of right shift push rod 139 to control the rearward movement thereof. Arm 469 is held in this position against the urgency of spring 470 by slide 471 which is slidably mounted on shaft 455 and carries upwardly extending arm 472 (Fig. 14) abutting the end of shift rack 473 in the inactive position of pin carriage 293. The first step of shifting movement of pin carriage 293 during the setting-up of the multiplier is insufficient to align arm 469 with pin 145 and such alignment occurs only after the second multiplier digit is entered, which is the extent of sliding movement permitted slide 471 and arm 469 under the influence of spring 470. Shaft 455 also carries arm 474 (Fig. 12) secured thereon and having pin 475 slidably engaged in an aperture in arm 469 to control the actuation thereof upon rocking movement of shaft 455. Arm 476 (Fig. 15), also carried by shaft 455, is provided with pin 477 engaged in the grooved collar 478 slidably mounted on shaft 191 and carrying slidable actuator 479 for engagement with shift rack 473 of pin carriage 293, so that shifting movement of the pin carriage is also enabled by the same rocking movement of shaft 455 under the influence of spring 480 (Fig. 18) when arm 411 is released. Actuator 479 is eccentrically driven from shaft 191 in a conventional manner as described in the aforementioned Patent No. 2,371,752.

The accumulator and pin carriage shift mechanisms are disabled during the multiplying operation after one cycle of movement if a value other than "0" is set in the next active multiplier rack 295. In the normally latched position of arm 411 (Fig. 18), arm 466 lies out of the path of the pin 453. However, upon release of latch 457, spring 480 urges arms 466 and 411 counter-clockwise to enable the shifting operation and arm 466 is positioned for engagement by pin 453. Near the end of the shift cycle the counter-clockwise rotation of cam 373 and pin 453 effects restoration of arm 411 to its latched inactive position and re-enables feed pawl 314.

Power-setting bellcrank 350 is also delatched for the shift cycle by the engagement of the arm 411 with pin 410 on latch lever 405, so that the plus-minus gears which are in inactive position during shifting can be reset by bellcrank 350 and cam 373 at the beginning of the next cycle if the next active multiplier rack 295 is adjusted to a multiplier digit value. If the next active rack 295 is at "0," another shifting cycle follows immediately by the positioning of lever 359, as described supra.

Multiplier correction key 481 for zeroizing the multiplier racks in the pin carriage without entry of values into the accumulator or counter, operates in a manner similar to that described in said Patent No. 2,371,752.

*Multiplication cycle control*

The number of machine cycles necessary to effect a registration of a product in the accumulator dials 20 is determined by the multiplier digit in each active rack 295 of the pin carriage 293. If a "1" is registered in the active segment 295, one machine cycle is utilized to effect a registration of the multiplicand in the keyboard in the accumulator dials 20. However, if a "2" is registered in the active segment 295, the segment is returned two steps in the first machine cycle and twice the multiplicand value in the keyboard is registered in the accumulator dials 20. Since the active segment 295 is restored two steps with each cycle of machine operation, the number of cycles required to register the correct product in the accumulator dials 20 will be half that of any even number represented by the setting of the segment. On the other hand, for any odd number greater than "1" represented by the active segment 295, the segment will be restored two steps with each cycle of operation with a final single step to control the registration of the product, e.g., if a "7" is represented by the active segment 295, the segment will be restored two steps for each of the first three cycles followed by a single step to restore the segment to "0" registration and to thereby enable the operation of the shifting mechanism. Thus, it is apparent that for a multiplier digit of "7" or "8," four machine cycles are required to effect a registration of the product in the accumulator dials 20. It becomes apparent, therefore, that if a multiplier digit value of "2" or greater is registered in the active multiplier segment 295, each cyclic biunial step restoration of the segment must effect a registration of the product in the accumulator dials twice that of the multiplicand value set in the keyboard.

Figure 4:
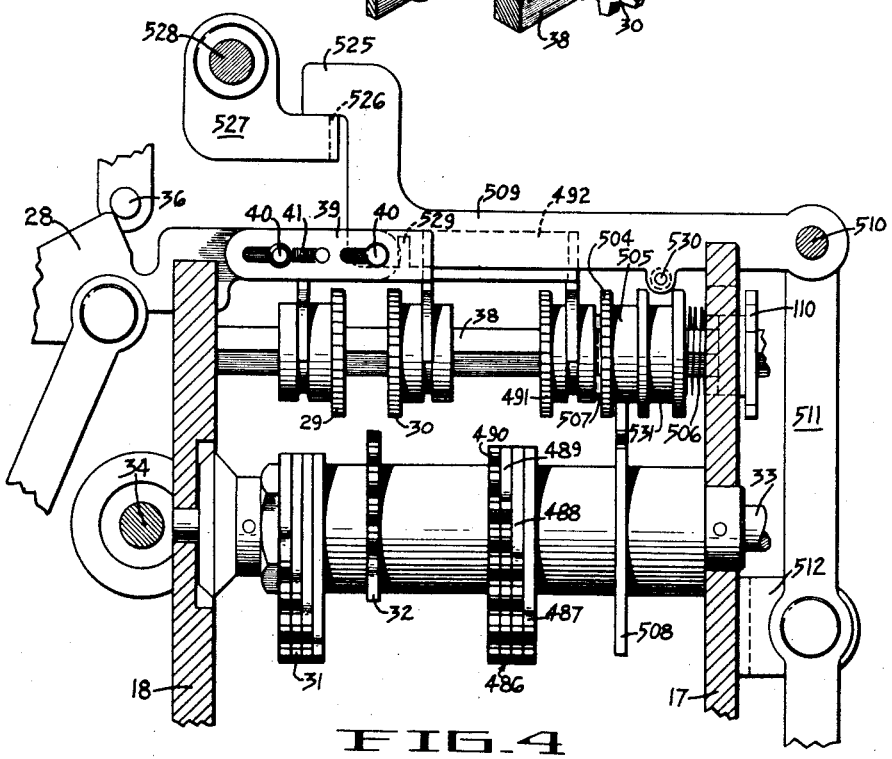
Fig. 4 is an enlarged elevational view of the ordinal actuating and selection mechanism.

Intermediate bearing plates 17 and 18, each actuator shaft 33 carries a laminated stepped tooth actuator 486 comprising four toothed sectors 487, 488, 489 and 490. As seen in Figs. 2 and 4, sector 487 is provided with two teeth, sector 488 carries four teeth, sector 489 six teeth and sector 490 is provided with eight teeth. The angular disposition of each actuator 486 on respective shafts 33 is identical and is such that the bottom row of teeth, as viewed in Figs. 4 and 8, of actuator 486 and that of actuator 31 are aligned. Each actuator 486 serves to control the incremental rotation of the associated adjacent pair of shafts 38 in accordance with the positioning of a corresponding ten-tooth gear 491. Each selection gear 491 is slidably and nonrotatably mounted on the associated shaft 38 and is normally maintained in the inoperative position shown in Figs. 2, 3 and 4 by means of an auxiliary selection slide 492 associated with each keyboard order of the machine. Each of the slides 492 is mounted for endwise movement in the framework of the machine similar to, and adjacent, the corresponding selection slides 27, 28. Intermediate its ends, each slide 492 is provided with a depending ear 493 (Fig. 2) having a pin 494 thereon normally abutting a depending ear 495 on the selection slide 27 of the corresponding keyboard order. Slides 492, and therefore the associated gears 491, are normally maintained in the inoperative position shown in Fig. 2 by a bail 496 extending transversely beneath the keyboard and supported at its ends in similar arms 497 rockably mounted on shaft 169. The positioning of selection gears 491 relative to the associated actuator 486 is under the control of bail 496 upon counter-clockwise rocking movement thereof by means to be hereinafter described. A pin 498 on the ear 493 of each slide 492 supports one end of a spring 499 secured at its other end in bail 496, the spring serving to maintain ear 493 in engagement with the bail and the pin 494 on ear 493 in engagement with the ear 495 of the associated selection slide 27.

It will be recalled that the latching bellcranks 62 associated with each keyboard order normally prevent endwise movement of the corresponding selection slides 27, 28. Thus, if bail 496 is rocked and there is no ordinal key depressed, spring 499 yields inasmuch as slide 492 of the corresponding keyboard order is blocked against movement also. As described previously, a depression of a "1" to "4" key or "6" to "9" key in any keyboard order operates to differentially move the associated selection slide 27 to position gear 29 relative to the corresponding actuator 31 and upon latching of the key in its depressed position the slide 27 is locked against further movement. Should the bail 496 be subsequently rocked counter-clockwise, as viewed in Fig. 2, spring 499 serves to urge the associated slide 492 forwardly to engage pin 494 thereon with the ear 495 of the actively moved slide 27. Therefore, gear 491 will be moved to the left an amount equal to the movement of the gear 29. For example, if the "4" key 26 is depressed, selection gear 29 associated therewith will be moved into position for engagement by the four teeth on associated actuator 31. Similarly, gear 491 in the same order will be moved into position for engagement by the eight-toothed sector 490 of the actuator 486. Thus, it can be seen that with the gears 29 and 491 so positioned, each cycle of the machine will effect a registration of "8" in the aligned accumulator dial 20 instead of "4" as indicated by the key depressed in that order of the keyboard. It will likewise be recalled that a depression of an ordinal "5" key positions the associated gear 30 for cooperation with the corresponding five-toothed sector 32; and in the case of a "6" to "9" key, the associated gear 29 will also be positioned relative to actuator 31 in accordance with the key depressed. Assuming that a "7" key is depressed, the five-toothed sector 32 and the two teeth on actuator 31 cooperate to effect a registration of "7" in the accumulator dial 20. However, if bail 496 is rocked counterclockwise, the associated gear 491 will be moved into position for cooperation with the four-toothed sector 488 of the corresponding actuator 486 and simultaneously therewith gear 30 will be moved to its inoperative position with respect to the corresponding five-toothed sector 32, as will be described hereinafter. Thus, the ensuing machine cycle will effect a registration of "4" in the aligned accumulator dial 20. To effect a registration of twice that of the keyboard value which, in this case, would be "14" would require the transfer of "1" into the next higher order dial 20.

Referring to Figs. 2, 3, 4 and 8, a ten-tooth transfer gear 504 is integral with a collar 505 slidably and non-rotatably mounted on each of shafts 38 except the units order shaft and is normally urged forwardly (or to the left, as viewed in Fig. 4) by a spring 506 into engagement with a keeper 507 on shaft 38. Each of actuator shafts 33 carries a single-toothed transfer gear 508 for cooperation with the transfer gears 504 on the adjacent pair of shafts 38 associated therewith. The angular disposition of each of single-toothed transfer gears 503 is identical on each of actuator shafts 33, as seen in Fig. 8, and each becomes effective to cooperate with any transfer gear or gears 504 which may have been moved into position for cooperation therewith during the multiplying operation.

When a key 26 representative of a "5" to "9" digit is depressed and latched in the units order of the keyboard and a multiplier digit of "2" or greater is registered in the active multiplier rack 295, the first multiplying cycle becomes effective to cause a registration twice that of the value in the keyboard in the accumulator dials 20. To use the example given above, upon depression of the "7" key 26, associated gear 29 is moved into position for cooperation with the two teeth of the corresponding actuator 31 and the associated gear 30 is moved into alignment with the five-toothed sector 32 for cooperation therewith. In a normal addition or subtraction operation, therefore, a "7" would be registered additively or subtractively in the aligned dial 20. However, in a multiplication operation using a multiplier of "2" registered in the active rack segment 295 of the pin carriage 293, bail 496 is rocked counter-clockwise to differentially position the corresponding gear 491 in accordance with the positioning of gear 29. Means are provided to simultaneously restore actively positioned gear 30 to its inactive position and to align transfer gear 504 in the next higher order with single-toothed gear 508. Hence, instead of a registration of "7" in the aligned accumulator dial 20 in the first multiplying cycle, a "4" is registered therein and a "1" is registered in the next higher order dial 20.

An arm 509 (Figs. 2, 3 and 4) is provided for each ordinal shaft 38 to control the movement of gear 30 to its inactive position and the movement of transfer gear 504 in the next higher order to its active position. Each arm 509 is freely mounted at its rearward end on a shaft 510 extending transversely of the machine and supported at its ends by similar levers 511 pivotally mounted intermediate the ends thereof on respective brackets 512, 513 secured on transverse frame member 17 (Figs. 2, 3 and 4). At its lower end each of the levers 511 carries a roller 514 urged by a spring 515 to follow its respective one of two similar cams 516 secured on a transverse shaft 517 journalled at its ends in side frame members 12 and 14 and intermediate its ends in auxiliary frame members 13 and 15. Spacers are provided on the shaft 510 between the arms 509 to maintain the ordinal spacing thereof and each arm 509 is engaged in a slot in the transverse bracket 17 to guide the arm in its reciprocatory movement upon rocking of levers 511. Cams 516 and levers 511 serve to control the rocking movement of bail 496. Each of the supporting arms 497 for bail 496 has a similar pivotal connection 518 with one end of respective links 519 and 520, each of which is similarly pivotally mounted at 521 on the corresponding lever 511 adjacent the lower end thereof.

The forwardly offset end 525 of each of arms 509 overlies an ear 526 formed at right angles to the horizontal extension of an associated arm 527 secured in ordinal arrangement on a transverse shaft 528 journalled at its ends in respective side frames 12 and 15. In the normally inoperative position of the arms 527, as viewed in Fig. 4, a notch 529 in the lower edge of each arm 509 adjacent the forward end thereof is normally maintained out of engagement with the upper edge of the associated yieldable yoke 39 mounted on the corresponding selection slide 28. Each of the arms 509 carries an elongated pin 530 extending to the left, as viewed in Fig. 3, for engagement in an annular groove 531 formed in the hub of the transfer gear 504 associated with the next higher order, which pin, in the normally inactive position of the arm 509, as seen in Fig. 4, is maintained out of engagement with the associated groove 531. Thus, it can be seen that in a keyboard setup such as that given in the example above in which the selection gear 30 in the units order has been moved into alignment with the corresponding five-toothed sector 32, the yoke of the slide 39 on selection slide 28 will be aligned with notch 529 in arm 509 for engagement thereby upon subsequent clockwise rocking movement of the shaft 528. With the engagement of the notch 529 with the sliding yieldable yoke 39, pin 530 on the corresponding arm 509 will be dropped into engagement with the annular groove 531 of the transfer gear hub 505 in the next higher order. Referring to Fig. 2, upon clockwise rotation of the cams 516, levers 511 will be rocked clockwise to actuate bail 496, thereby moving selection gear 491 in the units order inot active position with respect to the four-toothed sector 488 of the corresponding actuator 486. Simultaneously therewith, the units order arm 509 in engagement with the associated yieldable yoke 39 will be moved rearwardly to move the yoke to the right against the urgency of its spring 41, thereby moving selection gear 30 to its inactive position with respect to five-toothed sector 32. Likewise, the rearward movement of the arm 509 and the pin 530 thereon engaged in the groove 531 in the transfer gear hub 505 in the next higher order effects movement of the associated transfer gear 504 into position for engagement by the corresponding single-tooth actuator 508. In the ensuing cycle, therefore, "14" is registered in the accumulator dials 20 followed by a return of the arm 509 to its inoperative position and restoration of the bail 496 to its inactive position.

Whenever the arms 527 (Fig. 2) are restored to the normal position shown during a multiplication operation, those arms 509 which fell into engagement with the associated yieldable yokes 39 are raised and the springs 41 which were placed under tension become effective to restore the corresponding gears 30 into operative relation with the corresponding five-toothed sectors 32 and the compressed springs 506 (Fig. 4) restore the associated transfer gears 504 to their normally inoperative position. Substantially simultaneously therewith, a restoration of bail 496 under control of cams 516 restores the actively moved slides 492 and their associated gears 491 to their normally inactive position with respect to actuators 486. To control the rocking movement of arms 527 (Figs. 2 and 4), shaft 528 carries a depending arm 532 (Fig. 18) having a pivotal connection 533 with a link 534 pivotally connected at 535 on an arm 536 intermediate the ends thereof. Arm 536 is rockably mounted at its lower end on a stub shaft 537 secured in left side frame 14 and auxiliary frame 15 and at its upper end carries a roller 538 which is urged by a spring 539 to follow a cam 540 secured on shaft 517.

The rotation of the cams 516 and cam 540 is intermittently controlled by a clutch, generally indicated at 545 in Figs. 3 and 16. The driving member 546 is secured to one end of a sleeve 547 rotatable about shaft 517 and having a keyed connection at its other end with one hub of a miter gear 548, also rotatable on shaft 517 and having its other hub journalled in the bracket 512 secured on transverse frame member 17 of the machine. Sleeve 547 and ratchet 546 are cyclically driven through the engagement of miter gear 548 with a miter gear 549 secured on the rearward end of a shaft 550 journalled adjacent its ends in respective brackets 551 secured on frame member 13 and 552 secured on auxiliary frame member 64. At its forward end shaft 550 has a beveled gear connection 553 (Fig. 15) with shaft 191 which, it will be remembered, is driven cyclically through bevel gear connection 189 with main drive shaft 34. Thus, sleeve 547 and ratchet 546 are driven in synchronism with main drive shaft 34. Ratchet 546 comprises dogs 554 and 555 (Fig. 16) diametrically opposed for intermittent engagement with the tooth of a pawl 556 pivoted at one end at 557 on a disk 558 secured on transverse shaft 517 (Figs. 3 and 16). Adjacent its other end, pawl 556 is provided with an arcuate slot 559 engaged by a pin 560 on disk 558 and is urged to active position by a spring 561. Pawl 556 is normally restrained from movement to active position in the neutral, or full-cycle, position of the parts by the engagement of a nose 562 on one arm of a yoke 563 with the free end of pawl 556. The other arm of yoke 563 is provided with a nose 564 similar to nose 562 and diametrically opposed thereto. Yoke 563 is rockably mounted on a stud 565 secured in frame member 15 and is provided adjacent its pivotal mounting with a projection 566 having a pin 567 thereon pivotally supporting one end of a link 568, the other end of which is pivoted at 569 on the upper end of an upright arm 570 of an inverted T-shaped member 571 rockably mounted on a stud 572 on frame member 15. Link 568 is normally urged forwardly (or to the right, as viewed in Fig. 16) by a spring 573 to maintain nose 562 of yoke 563 in engagement with the free end of clutch pawl 556. However, it will be noted that upon clockwise rocking movement of yoke 563, nose 562 is moved out of engagement with pawl 556, thereby effecting an engagement of the tooth thereon with either dog 554 or 555 of ratchet 546. Following the initial 180° rotation of clutch 545 and shaft 517, the free end of pawl 556 engages the operatively positioned nose 564 of yoke 563 to release the pawl from its engagement with the ratchet 546. Similarly, a subsequent counter-clockwise movement of yoke 563 effects a re-engagement of the clutch 545 and after 180° rotation of the clutch, and therefore shaft 517, the operatively positioned nose 562 becomes effective to again disengage the clutch with the parts controlled thereby in their full-cycle position.

*Clutch control mechanism*

As previously stated, the differentially adjusted position of racks 295 in accordance with the value of the respective multiplier digits are utilized to control the number of registrations of the multiplicand in the accumulator and to shift the accumulator from left to right after the multiplication by each multiplier digit to enable correct registration of the next ordinal product as well as to shift the pin carriage so that the next higher order rack 295 comes into controlling position with respect to the operation of the machine. In order to control the operation of the machine from the differentially adjusted position of each active rack 295, means is provided for returning each adjusted rack a single step or in biunial steps to its initial position and for controlling the number of registrations in the accumulator by such return of the rack. The operation is successive from the adjusted rack of lowest order, with shifting of the accumulator and the multiplier carriage being effected during the last step of movement of each rack to condition the machine for operation in the next higher order. The oscillation of feed pawl 314 is such that with each machine cycle the step return of the actively positioned differentially adjusted rack 295 reduces by two the digital registration represented thereby when the value represented is "2" or greater. If a digital value of "1" is represented by the differentially adjusted rack 295, the last half of the step return by feed pawl 314 is effective to return the rack to its "0" position. Each of these conditions is sensed for each differentially adjusted rack in the actively shifted position thereof so that the ordinal registration of the multiplicand in the keyboard may be doubled with each cycle of operation or registered as represented by the keyboard.

As explained hereinbefore and as viewed in Fig. 16, in the "0" latched position of each of the rack segments 295, roller 308 thereon maintains associated sensing pawl 306 in the counter-clockwise rocked position shown against the urgency of spring 309. The angle of the camming surface 307 of each pawl 306 is such that upon adjustment of the associated rack 295 to its "1" position, roller 308 remains operative to maintain the associated pawl 306 in its normal counter-clockwise position. However, upon adjustment of a rack 295 to a digital representative position of "2" or greater, the corresponding roller 308 is moved counter-clockwise out of engagement with the associated pawl 306, which is then rocked clockwise under the urgency of its spring 309 to a position determined by the length of the slot in the upper pinboard plate.

As pointed out, irrespective of which key 166, 167 or 168 is depressed, after the initial carriage return or carriage return and resetting operation, the multiplying operation proceeds in the same manner once it is enabled by the override of the shift mechanism upon return of the carriage to the left end position. It will be recalled that upon operation of the override pawl 122, the power-setting means for the plus-minus gears is brought into play and also the return of the aligned multiplier rack 295 is enabled by movement of feed pawl 314 to active position. Means are also rendered operative by the operation of override pawl 122 to sense the differentially adjusted position of the actively positioned rack segment 295 for determining a single registration of the multiplicand in the product register, or a multiple registration thereof, with each ordinal multiplying cycle. For this purpose an upright arm 580 is secured on shaft 382 journalled in side frame members 14 and 15. The arm 580, at its upper end, has a pivotal connection 581 with one end of the link 582, the other end of which is provided with a pin-and-slot connection 583 on lever 584 pivotally mounted at 585 on the end of a horizontal arm 586 of T-shaped member 571. The other arm 587 of T-shaped member 571 carries pin 588 for engagement with a latch arm 589 pivoted on a stud 590 on side frame 15. Link 582 carries a pin 591 adjacent the right end thereof (Fig. 16) supporting one end of a spring 592, the other end of which is secured on an ear 593 formed at a right angle to lever 584. Spring 592 normally urges pin 583 on lever 584 into engagement with the left end of the slot in link 582. Intermediate its ends, lever 584 is offset to extend through an aperture in auxiliary side frame member 15 and is provided at its upper end with a rearward extension 598 (Figs. 15, 16 and 17) normally positioned above, and out of engagement with, a pin 599 on lever 359. Hence, it can be seen that upon operation of the override pawl 122 to release power-setting lever 378 for rocking movement (clockwise in Fig. 16) under the influence of spring 380, shaft 382 is rocked counter-clockwise to move link 582 to the left, as viewed in Fig. 16, enabling spring 592 to impart a counter-clockwise rocking movement to lever 584. However, if the actively positioned rack segment 295 is in its "0"

latched position or if the rack has been differentially adjusted to represent a multiplier digit of "1," sensing pawl 306 will remain in the position shown in Fig. 16, thereby preventing engagement of the extension 598 on lever 584 with pin 599 on lever 359. To prevent the engagement of the hook, or extension, 598 with pin 599, a sensing lever 600 is provided having a pin-and-slot connection 601 with the lower end of lever 584 and is guided for reciprocatory movement by the engagement of a slot in the rearward end thereof with a pin 602 on latch arm 589 intermediate the ends thereof. Adjacent its forward end lever 600 is engaged in a slot in a bracket 603 secured on side frame member 15 for reciprocation therein. At its free end lever 600 is provided with an extended nose 604 formed at right angles thereto having the corners thereof beveled, as seen in Fig. 3, to form camming surfaces which cooperate with a projection on sensing pawls 306. If the actively positioned rack segment 295 is differentially adjusted to represent a multiplier digit or value of "2" or greater, spring 309 is effective to rock the associated sensing pawl 306 (clockwise in Fig. 16) thereby removing its projection thereon from engagement with the end of the nose 604 of reciprocating lever 600.

Upon initiation of the multiplying phase of the operation by override pawl 122 the rocking of bellcrank 381, and therefore shaft 382, rocks lever 584 (counter-clockwise in Fig. 16) about its pivot 585 to move lever 600 forwardly (or to the right, as viewed in Fig. 16), and to move extension 598 over pin 599 on lever 359. Substantially simultaneously with the engagement of extension 598 with pin 599, the rocking of lever 381 also rocks lever 388 (Fig. 17) which, through link 391, imparts clockwise movement to lever 359, thereby imparting lengthwise movement to lever 584. Inasmuch as the multiplier digit represented by the actively positioned segment is "2" or greater, clutch 545 is engaged to effect a multiple registration of the multiplicand in the product register. To enable the engagement of the clutch 545, the upward movement of the lever 584 by lever 359 rocks T-shaped member 571 (in a counter-clockwise direction in Fig. 16) to move the nose 562 of yoke 563 out of engagement with clutch pawl 556, thereby effecting engagement of clutch 545 for semi-cyclic operation. The vertical edge of a hook end 605 of latch arm 589 is normally maintained in engagement with pin 588 on T-shaped member 571 under the urgency of a spring 606. However, upon movement of the lever 600 to the right and upon rocking movement of the T-shaped member 571 to initially engage clutch 545, hook 605 is urged by spring 606 to a position overlying pin 588, thereby latching the mechanisms controlled thereby in their active positions. Following 180° rotation, clutch 545 is disengaged and remains disengaged until the active rack segment 295 has been restored to the position representative of a "1" or through the "1" position, whereupon roller 308 engages the associated sensing pawl 306, restoring the pawl to its normally inactive position. Upon restoration, pawl 306 imparts a rearward movement to lever 600 which becomes effective to release latch 589 from its engagement with pin 588 and enables spring 573 to restore yoke 563 to the position shown in Fig. 16. Thus, the clutch 545 is again engaged for its final 180° rotation to the full-cycle position thereof and the mechanisms controlled thereby are restored to their inactive position. If the active rack segment 295 is returned to the position representative of "1," the following multiplier cycle returns the rack segment to "0" and effects a single registration of the multiplicand in the product register.

If the multiplier digit represented by the differentially adjusted rack segment 295 in the active position thereof is an even number, roller 308 will become operative under control of pawl 314 during the first half of the last step in the return of the segment to its "0" position to restore the associated sensing pawl 306 to its inoperative position, thereby releasing latch 589.

Upon reaching its "0" latched position the active segment 295 rocks lever 359 counter-clockwise, thereby initiating a right shift of the accumulator and of the multiplier pin carriage to move the next higher order rack segment 295 into active position relative to feed pawl 314 in a conventional manner. If the now actively positioned rack segment 295 is in its "0" latched position, pawl 306 prevents movement of sensing lever 600 and a shift cycle ensues. Similarly, if the now actively positioned rack segment 295 is differentially adjusted to represent a multiplier digit of "1," sensing pawl 306 associated therewith is maintained in its inactive position, thereby preventing movement of lever 600 and a single registration of the multiplicand value in the keyboard of the machine is effected in the accumulator.

*Revolutions counter mechanism*

Mounted on the carriage 21, in addition to the accumulator, is a revolutions counter, generally designated at 612 (Fig. 2). This register comprises a plurality of square shafts 613 journalled at opposite ends in the accumulator frame and in the front carriage rail 614. The ordinal spacing of the shafts 613 is identical to the spacing of, and are aligned with, accumulator dials 20. Each of these square shafts 613 carries a numeral wheel 615 slidably and nonrotatably mounted thereon and bearing numerals from "0" to "9," spaced-apart on the periphery of the wheel.

The individual numbers on the wheel 615 are properly centralized in line with the aperture in the casing of the machine by a ten-tooth star wheel 616 in engagement with a spring-pressed ball (not shown) conventionally mounted in the accumulator frame of the carriage 21. Also, the shafts 613 are provided with clearing gears 617 meshing with a multisectional clear rack 618 which cooperates in a well-known manner to restore those wheels 615 to "0" which have been displaced therefrom. The revolutions counter is therefore provided with a plurality of numeral wheels 615 arranged in spaced relationship and in any desired number for the capacity of the machine. The individual wheels of this register are normally urged forwardly (or to the left, as viewed in Figs. 2 and 19) by compression springs 619, are all properly centralized by their star wheels, and may be simultaneously restored to "0," or cleared, position by manual means or under the control of power-operated means, as is well-known in the art.

In order to actuate or introduce values into the revolutions counter there is provided a suitable actuator. The actuator includes shaft 620 (Figs. 19, 20 and 21) which has a compound motion having two major components, one a translatory reciprocation and the other a rotary oscillation, that is, the shaft 620 is mounted in side frame members 12 and 13 to be moved from end-to-end and to be rocked back and forth. The construction of the revolutions counter actuator is, for the most part, conventional and therefore will be only briefly described herein. Mounted on the shaft 620 is a pair of arms 621 (the right-hand arm only being shown in Fig. 20), each of which supports one end of a rod 622. Also disposed on the shaft 620 is a plurality of actuator spools 623 which, in general, are identical and are of such size as to be spaced with the same spacing as the shafts 613, all of the spools except the right-hand spool in Fig. 20 being operative for tens-transfer actuation only while the right-hand spool 623 carries the counting actuator. The right-hand spool 623, as viewed in Fig. 20, is only partially complete as compared with the other spools and at its one end carries finger 624 which projects radially between a ten-tooth gear 625 (Fig. 19) and a single notch disk 626 integral with each numeral wheel 615. At its other end, the right-hand spool 623 carries an arm 627 overlying rod 622 and normally maintained in engagement therewith and at its free end is provided with an elongated lateral extension 628 which normally overlies a blocking member (not shown) mounted on plus-minus gate 77. In the centralized position of the gate 77 and the plus-minus gears 72, 73 the blocking member functions in a well-known manner to prevent oscillation of the counting finger 624.

Each finger 624 supports one end of a spring 630, the other end of which is supported by rod 622. Thus, the spring 630 urges finger 624 to rotate clockwise, as viewed in Fig. 19, about the shaft 620. As particularly seen in Fig. 19, therefore, as shaft 620 oscillates clockwise, carrying with it, the rod 622, finger 624 is introduced between successive teeth on the associated gear 625 under the urgency of the corresponding spring 630. At this juncture the oscillation of the shaft 620 is interrupted and the shaft is translated axially toward the left, as viewed in Fig. 20, and since the finger 624 remains between successive teeth on the ten-tooth gear 625, the axial translation of the shaft is effective to rotate numeral wheel 615 and therefore square shaft 613 one-tenth of a complete revolution, thus, advancing the numeral wheel 615 for one successive digit. At the conclusion of such axial translation toward the left, as seen in Fig. 20, the shaft 620 again oscillates, but this time in a counter-clockwise direction so that the finger 624 is positively restored to its inactive position due to the contact of the rod 622 with the arm 627, thereby moving finger 624 out of mesh with the pinion 625. The return axial translation of the shaft 620 toward the right, therefore, restores the parts to their original position.

It is especially pointed out that if, when the shaft 620 initially rotates to mesh the finger 624 with the aligned ten-tooth gear 625, such engagement is followed by an axial translation of the shaft 620 toward the left, for instance in Fig. 20, the numeral wheel is advanced in a positive direction. On the other hand, if the shaft 620 is first axially translated to the left, as seen in Fig. 20, followed by clockwise oscillation of the shaft to engage the finger 624 with the teeth of the associated, or aligned pinion, 625, the subsequent axial translation of shaft 620 to the right effects a unit rotation of the numeral wheel 615 in the other direction for a subtractive, or negative, registration thereon. Following the decremental unit rotation of the numeral wheel 615, shaft 620 is again oscillated in a counter-clockwise direction to remove the finger 624 from its engagement with the ten-tooth gear 625 thereby restoring the parts to their normal, or original, position.

For each complete rotation of a lower order numeral wheel 615 of the revolutions counter, a numeral wheel of the next higher order must be advanced one-tenth of a rotation. To this end the spool 623 which is arranged intermediate the lowest, or right-hand, order, as viewed in Fig. 20, and the next higher order is not only provided at its left-hand end with a finger 624, but is also provided at its right-hand end with a finger 631 which is formed to be coplanar with finger 624 of the lowest order and carries a projection 632 (Fig. 21) which normally abuts the associated finger 624. Thus, the spring 630 of the tens order, for example, is effective to urge the projection 632 of the finger 631 into engagement with the finger 624 of the units order. However, the spool 623 of the units order cannot yield since the arm 627 is in contact with rod 622. When, however, the shaft 620 and therefore rod 622 are rocked clockwise, as viewed in Fig. 19, the finger 631, under the urgency of the spring 630 in the tens order, tends to follow the finger 624 of the units order but can only do so when the notch in the disk 626 associated with the aligned numeral wheel 615 is in position therefor, which only occurs when the counter numeral wheel aligned with the units order passes from "9" to "0" or vice versa.

If the notch is out of position to receive finger 631, i.e., when no tens-transfer has been determined by the counter numeral wheel associated with the units order of the machine, finger 631 cannot pass beyond the face of the disk, so that the spool 623 associated therewith and the finger 624 of the tens order is held in its inactive position. Correspondingly, due to the similar interlocking relationship of the remainder of the spools 623 for the higher orders, all such higher order spools are maintained stationary. On the other hand, if the tens-transfer notch in the disk 626 of the units order is in position to permit passage of the finger 631 associated therewith, then such finger rotates along with the finger 624 of the units order, causing a corresponding rotation of the spool 623 of the tens order, and the finger 624 of the tens order is effective on the associated gear 625 on the aligned shaft 613 of the next higher, or tens, order in the revolutions counter to rotate such shaft through one-tenth of a rotation and thereby effect the tens-transfer operation.

The rotary oscillation and lateral reciprocation of shaft 620 is controlled in a well-known manner and is produced in synchronism with the rotation of the drive shaft 34. To control the oscillation of shaft 620, lever 636 is pivoted at 637 on side frame 13 (Fig. 16) and carries a vertical extension 638, the upper end of which is provided with an open slot 639 embracing pin 640 on the lower end of arm 641 freely mounted on the hub of arm 642 secured on the end of shaft 620. Arm 641 is mounted adjacent arm 642 and is provided with an ear 643 supporting one end of spring 644, the other end of which is carried by ear 645 on arm 642 and serves to normally maintain ear 645 in engagement with the edge of the arm 641, thereby forming a yieldable control for the oscillation of the shaft 620. To enable a rotary oscillation of arms 641, 642 and the shaft 620, lever 636 is provided at its right end with a distended portion having a square aperture 646 therein for cooperation with a triangular eccentric cam 647 secured on drive shaft 34, so that, upon cyclic rotation of cam 647, shaft 620 is rocked to-and-fro. The timing of the rotary oscillation of shaft 620 provides for engagement of the actuator finger 624 with the associated ten-tooth gear 625 after approximately 90° rotation of cam 647, after which the axial translation of shaft 620 becomes effective to cause a one-tenth rotation of the associated numeral wheel 615 in an additive direction. Further rotation of cam 647 removes counting finger 624 from its engagement with ten-tooth gear 625 followed by axial translation of shaft 620 in the opposite direction to restore the shaft to its original position. For a subtractive registration on a numeral wheel dial 615, the axial translation of shaft 620 to the left, as viewed in Fig. 20, is effected immediately upon the initiation of a cycle of operation followed by a rotary oscillation of the shaft after approximately 90° of the cycle when the counting finger 624 engages the associated ten-tooth gear 625, after which the axial translation of the shaft 620 to the right causes a one-tenth rotation of the corresponding numeral wheel 615 in a subtractive direction. The subsequent oscillation of the shaft restores the finger 624 to its original position.

The axial translation, or reciprocatory movement, of shaft 620 is controlled by a cam drum 650 (Fig. 12) mounted on drive shaft 34 and having a pair of grooves cut therein. These cam grooves are of identical contour but are polarly, or angularly, spaced from each other. In order to change the phase relationship of the axial movement of the shaft 620 to the rotary movement thereof, means are provided for optional engagement with either of the grooves in the cam drum 650. A pair of similar brackets 651 are mounted on side frame member 12 (Figs. 12 and 20) and support the ends of shaft 652. The lower end of a sleeve rockably mounted on shaft 652 carries arm 653 and its upper end carries lever arm 654. At their extremity each of arms 653 and 654 carries a similar pin 655, the pin on arm 653 being adapted for engagement with the left-hand groove in cam drum 650, while the pin on arm 654 is adapted for engagement with the right-hand groove of the drum. On its rearward extremity, lever arm 654 carries elongated pin 656 engaged in the annular groove of collar 657 secured on shaft 620.

The sleeve supporting the arms 653 and 654 is slidable vertically on shaft 652 to optionally engage the pin 655 on either of the arms with the associated groove in the cam drum 650 to effect an additive or subtractive registration in the revolutions counter wheel 615. The mechanism for selectively controlling the engagement of the pin on either of the arms with the corresponding groove is of conventional construction and is not shown herein. If the pin on arm 653 is moved into engagement with its associated groove on drum 650 the numeral wheel 615 associated with the units order of the machine is rotated in an additive direction, whereas, if the pin 655 on arm 654 is moved into engagement with the corresponding right-hand groove in drum 650 the registration on the counter numeral wheel is negative.

It will be recalled that whenever an actively positioned rack segment 295 is differentially adjusted to a multiplier digit value of "2" or greater, each multiplying cycle of operation under the control of this segment effects a registration in the accumulator dials 20 twice that of the multiplicand value standing in the keyboard. The number of cycles is determined by the digit represented and continues until the segment has been restored to its "1" or "0" position, whereupon a single registration of the multiplicand will be effected with the segment in its "1" position or upon return to "0," will effect an ordinal shift of the accumulator and of the multiplier pin carriage 293 to actively position the next higher order rack segment 295 for control of the operation. Under this condition, when a multiple registration of a multiplicand in the keyboard is effected with each cycle of operation, the revolutions counter wheel 615 associated with the units order of the machine must receive two-tenths of a rotation to correctly register the digit of the multiplier. As explained hereinbefore, the setting of each multiplier rack segment 295 is sensed upon movement thereof into active position relative to feed pawl 314 to control the operation of clutch 545 which, upon engagement thereof, enables the multiple registration of the multiplicand in the aligned accumulator dials 20. Therefore, means are provided under the control of the clutch 545 for enabling mechanism to control a multiple registration in the revolutions counter numeral wheel 615 aligned with the units order of the keyboard. For this purpose the units order, or right-hand, counting finger 624 (Fig. 19) is formed to carry a pin 662 having a head spaced therefrom to form an annular groove for receiving the forked end 663 of a lateral extension of an auxiliary counting finger 664 rockably mounted on a shaft 665 extending transversely of the machine parallel to shaft 620 and journalled at its ends in side frame members 12 and 13. As viewed in Fig. 19, therefore, it can be seen that clockwise rotation of counting finger 624 is effective to impart a counter-clockwise rotation to counting finger 664. A spool 666, similar to spools 623, is mounted for oscillatory movement on shaft 665 and carries at its one end a finger 667 formed to be coplanar with finger 664 of the lowest, or units, order and is provided with a projection 668 which bears against the finger 664. At its other end spool 666 carries a horizontally disposed arm 669, the bifurcated end of which is engaged with a pin 670 on an ear 671 of the counting finger 624 associated with the tens order numeral wheel 615 (Fig. 21). The spring 630 of the tens order is effective to urge the projection 668 of finger 667 into contact with counting finger 664 of the units order. The spool 666 and counting finger 664 are retained in position on shaft 665 for cooperation with the units order and tens order counter fingers 624 by similar collars 672 secured on shaft 665.

Figure 19:
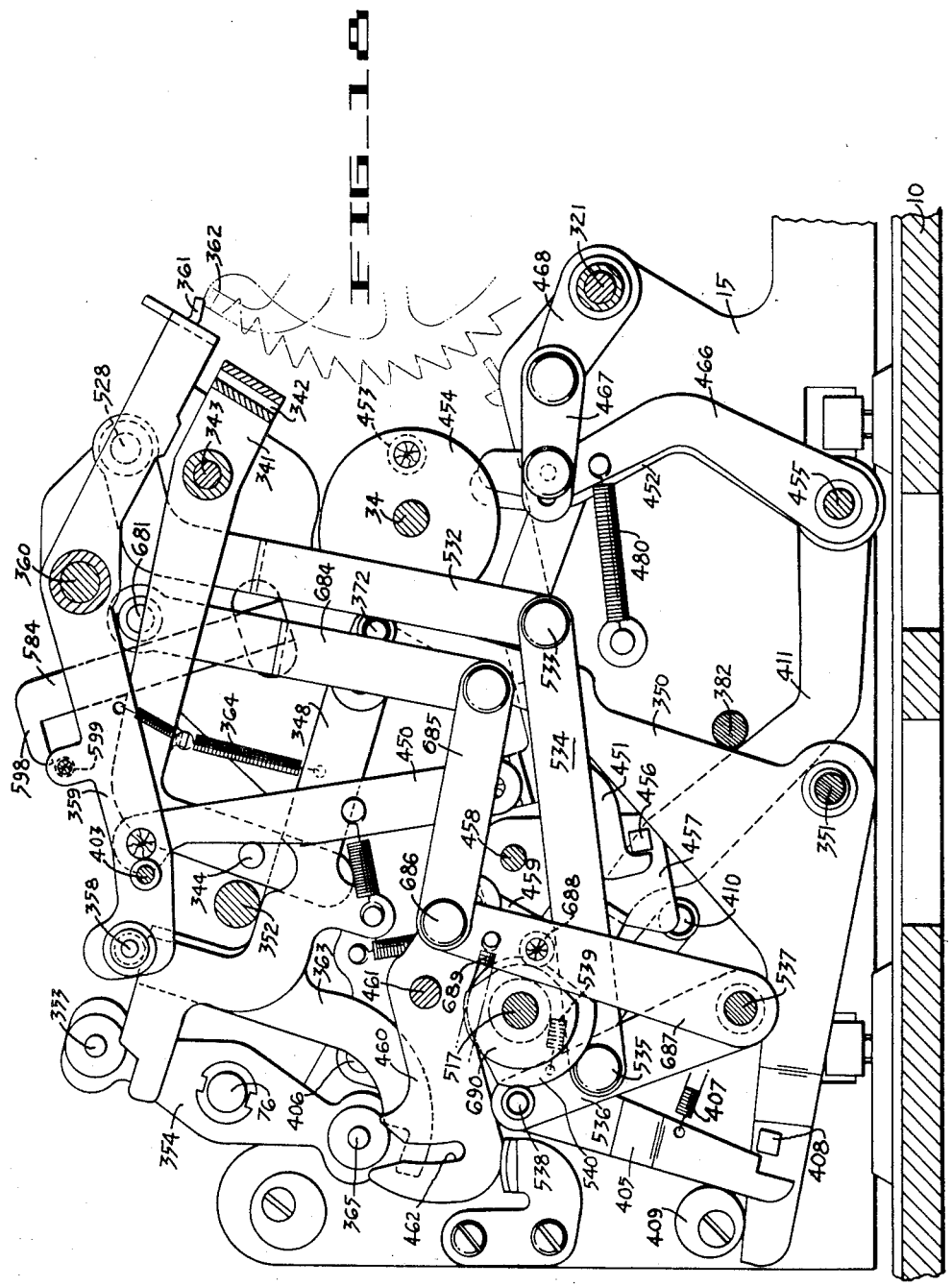
Fig. 19 is an enlarged sectional elevational view of the revolutions counter actuator and the auxiliary actuator controlled thereby.

Normally, springs 619 maintain numeral wheels 615, associated gears 625 and single notch disks 626 in the position shown in Fig. 19. However, if the numeral wheel 615 aligned with the units order of the keyboard, that is, the units order counter wheel, is moved rearwardly (or to the right, as viewed in Fig. 19) compressing spring 619, the associated gear 625 and disk 626 are moved sufficiently to prevent the engagement of the corresponding counter finger 624 with the ten-tooth gear 625 and the corresponding finger 631 is free to be moved. A collar 673 integral with each of numeral wheels 615 carries a ten-tooth pinion 674 of considerably smaller diameter than pinions 625 and at its outer end carries a single notch disk 675 of a diameter equal to that of pinion 674 and serving as an abutment for one end of the associated spring 619. In the normal spring-urged position of the units order wheel 615, pinion 674 and disk 675 are out of position for engagement by respective fingers 664 and 667 upon clockwise rocking movement of the counter finger 624. However, upon movement of the units order wheel 615 from its normal position, pinion 674 and disk 675 are moved into position for engagement of the finger 664 between the teeth of pinion 674 and to enable the movement of finger 667 into the notch in disk 675 when the numeral wheel passes from "9" to "0" and vice versa. Although the finger 631 is free to be rocked with the associated finger 624 in the moved position of the wheel 615, the engagement of the finger 667 with the face of disk 675 prevents a rocking movement of the finger 631 and the tens order counting finger 624.

Means are provided for control by clutch 545 upon the engagement thereof from the full-cycle position to impart a lateral movement to the units order numeral wheel 615, and for this purpose an arm 680 (Figs. 2, 19 and 20) is secured on a transverse shaft 681 journalled in side frame members 12, 13 and 15. Arm 680 is positioned on shaft 681 for cooperation with the units order counter numeral wheel 615, i.e., the numeral wheel aligned with the units order of the machine, and is provided with an upwardly extended finger 682 angularly offset to provide sufficient operating clearance and terminating in a vertically disposed tip for engagement in an annular groove 683 in the hub of the aligned numeral wheel 615. At its left end, shaft 681 (Figs. 3 and 18) carries a depending arm 684 pivotally connected at its free end with one end of a link 685, the other end of which is pivoted at 686 on the upper end of a cam follower arm 687 rockably mounted on stud 537 on side frame member 14. Arm 687 is provided with a roller 688 intermediate its ends, which roller is urged by spring 689 into engagement with a cam 690 secured on clutch controlled shaft 517. Thus, it can be seen that in the first 90° of rotation of cam 690 upon engagement of clutch 545 for its first phase of operation, shaft 681 is rocked (counter-clockwise in Fig. 18 or clockwise in Fig. 19) to move the units order wheel 615 rearwardly. Similarly, after 90° of rotation of cam 690 in the second phase of the operation of the clutch 545, numeral wheel 615 is restored to its normal position.

During a multiple registration cycle when an accumulative or negative multiplication operation is in progress and the units order dial is rotated from "8" to "0," or "9" to "0," or from "0" to "9," or "0" to "8," a "1" is registered additively or subtractively, respectively, in the next higher order numeral wheel 615. Therefore, the notch in the disk 675 associated with the units order numeral wheel 615 is of sufficient length to accommodate finger 667 in any one of these conditions, i.e., when the dial 615 registers "8" or "9" and "2" is added thereto, or when the dial registers "1" or "0" and "2" is subtracted therefrom. If any one of these conditions exists or occurs, the rocking of the conventional right-hand counting finger 624 (clockwise in Figs. 19 and 20) will be effected to rock auxiliary counting finger 664 into engagement with pinion 674 and simultaneously therewith the auxiliary finger 667 will pass into the arcual notch in the associated disk 675. Referring to Fig. 21, upon oscillation of shaft 665 to effect entry of finger 667 into the notch of disk 675, arm 669 integral with finger 667 is rocked (clockwise in this figure) and upon reciprocation of shaft 665 the conventional counting finger 624 associated with the tens order dial 615 effects a one-tenth rotation of the corresponding dial. The rotary oscillation of shaft 620 is transmitted through the right-hand counting finger 624 (Fig. 20) and pin 662 to rock counting finger 664 on parallel shaft 665 unless arm 627 integral with finger 624 is blocked by conventional means (not shown) under the control of the plus-minus gate 77 in the neutral or centralized position thereof. To control the axial translation of shaft 665 in synchronism with that of shaft 620, an arm 700 is freely mounted at its one end on shaft 620 between the hub of arm 621 and the collar 657, and at its other end is provided with a semi-circular indentation partially encompassing shaft 665 and positioned between two similar collars 701 secured on shaft 665. Therefore, any axial translation of shaft 620 will move shaft 665 an equal amount in the same direction. As explained above, each of the pinions 674 integral with numeral wheels 615 is considerably smaller in diameter than pinions 625. Correspondingly, the counting finger 664 associated with the units order wheel 615 is of a greater length than the corresponding finger 624 so that upon axial translation of shaft 665 a two-tenths rotation is imparted to the aligned numeral wheel.

*Operation*

In approximately 90° of the override cycle, shaft 382 is rocked and if an engagement of the hook 598 of lever 584 with pin 599 (Fig. 16) is effected, clutch pawl 556 is initially released and after 180° in the override cycle clutch dog 554 engages the tooth of pawl 556 to enable the operation of the clutch 545. Referring to Fig. 2, following approximately 90° clockwise rotation of the cams 516, that is, after approximately 270° of the override cycle, bail 496 is rocked to enable the differential positioning of gears 491 relative to the corresponding actuators 486. Likewise, cam 690 (Fig. 18) becomes effective to rock shaft 681, thereby moving the counter numeral wheel 615 in the units order rearwardly for a multiple registration. Almost immediately upon engagement of clutch 545, rotation of cam 540 (counter-clockwise in Fig. 18) is effective also to enable a rocking movement of shaft 528 under the urgency of spring 539, thereby releasing the ordinally arranged arms 509 (Figs. 2 or 4) for engagement with the yoke 39 of the associated slides 28 which have been moved to a "5" selection and to position the pins 530 on the engaged arms 509 in the annular groove 531 in the collar of the transfer gear 504 of the next higher order. Simultaneously with the rocking of the bail 496, arms 509 will be moved rearwardly (Fig. 2) and those arms which have dropped into engagement with the yokes controlling the positioning of the corresponding gears 30 will move the gears out of alignment with the corresponding five-toothed sectors 32. With the movement of the gear 30 in a lower order from an active to an inactive position, the tens-transfer gear 504 in the next higher order will be moved into position for engagement by single-toothed actuator 508 associated therewith to effect a registration of "1" in that order during the multiplying cycle. It will be noted also that in those orders in which a "5" to "9" key has been depressed, the associated slide 28 will be locked in its differentially adjusted position so that, upon movement of the corresponding gear 30 to its inactive position, spring 41 is placed under tension to restore the associated inactively positioned gear 30 to its active position, as will be described.

Upon termination of the override cycle, or after 180° rotation of clutch 545, pawl 556 engages nose 564 of yoke 563 to effect a disengagement of the clutch 545 for the ensuing cycle or cycles, i.e., until the actively positioned rack segment 295 has been returned to the position thereof representative of "1" or upon return movement thereof through the "1" position to the "0" latched position. In either instance, in approximately 160° in the ordinal multiplying cycle as the active rack is returned to, or through, its "1" position, the associated sensing pawl 306 moves lever 600 rearwardly, releasing latch 589 thereby enabling spring 573 (Fig. 16) to restore yoke 563 to the position shown, releasing pawl 556 for engagement by clutch dog 555 in 180° of the effective cycle. Upon engagement of dog 555 with the tooth of pawl 556, clutch 545 becomes effective in the last 180° of the cycle to restore cams 516 (Fig. 2) and cams 540 and 690 (Fig. 18) to the inoperative positions shown, whereupon the nose of pawl 556 engages nose 562 of yoke 563 to disengage clutch 545 in the full-cycle position thereof. Following approximately 90° rotation of the cams 516 and cams 540 and 690 during the final 180° rotation of clutch 545, that is, in approximately 270° of the effective multiplying cycle, bail 496 and arms 509 are simultaneously restored to the inactive position shown in Fig. 2 and the counter numeral wheel 615 is restored to its normal position. Thereafter, the yokes 39 are effective to restore the associated gears 30 to their active position with respect to the corresponding five-toothed sectors 32 under the influence of the tensioned springs 41. Similarly, compression springs 506 are effective to return the actively positioned tens-transfer gears 504 to their inactive position with respect to the corresponding single-toothed actuators 508. During each of the multiplying cycles controlled by the actively positioned rack segment 295, the multiplicand value set in the keyboard will have been registered twice, or doubled, in the accumulator dials 20; and in each keyboard order where a "5" or greater value key was depressed, a registration of "1" was effected in the next higher order dial 20 at the beginning of each cycle of operation. If the actively positioned rack segment 295 was differentially adjusted to represent an odd numbered digit, the segment will become effective to control a final multiplying cycle in which it is returned to its "0" latched position. In this cycle of operation, the multiplicand in the keyboard will have been registered in a conventional manner in the accumulator dials 20.

The shift cycle to follow is initiated by the active rack segment 295 upon reaching its "0" latched position and is controlled in a conventional manner to move the next higher rack segment 295 to its active position and to shift the accumulator ordinally to the right. If the next higher rack segment 295 is in its "0" latched position, or if it is differentially adjusted to represent a multiplier digit of "1," the sensing pawl 306 associated therewith, upon movement of the segment to active position, prevents engagement of the clutch 545. If the actively positioned segment 295 is in its "0" position, another shift cycle ensues. However, if it has been adjusted to "1" position the multiplicand in the keyboard is registered once in the accumulator dials 20 as the feed pawl 314 returns the segment to its "0" position to initiate a shift cycle in a conventional manner. On the other hand, if the next higher rack segment 295 is differentially adjusted to represent a multiplier digit of "2" or greater, the spring 592 interconnecting link 582 and lever 584, under tension becomes effective in approximately 90° of the shift cycle to urge lever 600 forwardly (or to the right in Fig. 16). After approximately 140° in the shift cycle, lever 359 is rocked clockwise, as viewed in Fig. 17, under the urgency of the spring 402 which was tensioned upon initiation of the shift cycle. Lever 584 is therefore moved lengthwise upwardly to effect release of the clutch pawl 556 for engagement by dog 554 at 180° of the shift cycle and clutch 545 becomes effective in the first phase of operation to control a multiple entry of the multiplicand in the keyboard with each multiplying cycle thereafter. The ordinal multiplying operation will then continue in the manner described above.

To exemplify the cyclic control of a multiplying operation using a multiplier of "8501" and a multiplicand of "1573" each cyclic operation is registered as follows:

| Accumulator | | Counter | | |
|---|---|---|---|---|
| 0 0 0 0 0 0 0 0 | | | | |
|       1 5 7 3 | | | | |
| 0 0 0 0 1 5 7 3 | First cycle | 1 | | |
| 0 0 0 0 1 5 7 3 | Shift cycle | 0 | 1 | |
| 0 0 0 0 0 1 5 7 3 | Shift cycle | 0 | 0 | 1 |
|       1 1 | Beginning of 2nd cycle | | | |
|       2 0 4 6 | | | | |
| 0 0 0 0 3 1 6 1 7 3 | Second cycle | 2 | 0 | 1 |
|       1 1 | Beginning of 3rd cycle | | | |
|       2 0 4 6 | | | | |
| 0 0 0 0 6 3 0 7 7 3 | Third cycle | 4 | 0 | 1 |
|       1 5 7 3 | | | | |
| 0 0 0 0 7 8 8 0 7 3 | Fourth cycle | 5 | 0 | 1 |
| 0 0 0 0 0 7 8 8 0 7 3 | Shift cycle | 0 | 5 | 0 1 |
|       1 1 | Beginning of 5th cycle | | | |
|       2 0 4 6 | | | | |
| 0 0 0 0 3 9 3 4 0 7 3 | Fifth cycle | 2 | 5 | 0 1 |
|       1 1 | Beginning of 6th cycle | | | |
|       2 0 4 6 | | | | |
| 0 0 0 0 7 0 8 0 0 7 3 | Sixth cycle | 4 | 5 | 0 1 |
|       1 1 | Beginning of 7th cycle | | | |
|       2 0 4 6 | | | | |
| 0 0 0 1 0 2 2 6 0 7 3 | Seventh cycle | 6 | 5 | 0 1 |
|       1 1 | Beginning of 8th cycle | | | |
|       2 0 4 6 | | | | |
| 0 0 0 1 3 3 7 2 0 7 3 | Eighth cycle | 8 | 5 | 0 1 |

By reference to the above schedule it can be ascertained that only eleven cycles were required to complete the multiplication operation whereas if the operation were to have been computed in a conventional manner seventeen cycles would have been utilized.

I claim:

1. In a calculating machine having a product register, a selection mechanism settable to represent a multiplicand, a cyclically operable actuating means normally controlled by said selection means and operable to control a single registration of the multiplicand in said product register, means for shifting said register in either direction relative to said selection mechanism, a zero resetting mechanism selectively operable to zeroize said register, and a multiplying mechanism comprising: a first control key for initiating operation of said resetting mechanism, a second control key, means controlled by either of said keys upon operation thereof to enable the operation of said shifting means to shift said register in one direction to an end position, a multiplier carriage having ordinal differentially settable elements for controlling a plural order operation of said cyclically operable actuating means, means for differentially setting said elements, normally inoperative means for ordinally shifting said carriage, means for restoring the one of said differentially settable elements in a predetermined ordinal postion a single step from a differentially set position of "1" and biunially step-by-step from a differentially set position greater than "1," normally inactive multiplier control means operable by the predetermined one of said differentially settable elements upon its restoration to its "0" position to control the operation of said shifting means to shift said register ordinally in the other direction and to enable the operation of said carriage shifting means, means adjustable to effect a multiple registration of the multiplicand in said product register upon each cycle of operation of said actuating means, clutch controlled means for adjusting said adjustable means, means engageable with the predetermined one of said settable elements for actuation thereby to effect operation of said clutch controlled means whenever such settable element is set for a value greater than "1," resilient means for effecting engagement of said engageable means, means operated by said shifting means in the end position of said register for enabling operation of said resilient means and said restoring means upon operation of either of said keys, means for latching said engageable means in the actuated position upon operation of said multiplier control means, positionable means associated with each of said elements normally operable by each of said elements in the differentially set position of "1" to prevent engagement of said engageable means with said predetermined settable element, and sensing means for sequential cooperation with said positionable means operable upon return of each of said elements to the set position of "1" to release said latching means and to disengage said engageable means.

2. In a calculating machine for performing plural order operations having a shiftable register, a keyboard in which a value is set, a selection mechanism differentially settable by said keyboard upon entry of a value therein, a cyclically operable actuating means for cooperation with said selection mechanism to normally effect a single registration of the keyboard value in said register, a cyclic drive means for said actuating means, and a plural order operation control mechanism, the combination comprising a control key, a storage mechanism including a plurality of ordinal elements differentially settable to represent the digits of a factor, means associated with said selection mechanism adjustable for control by said actuating means to effect a multiple registration of a keyboard value in said register upon unicyclic operation of said actuating means, means driven by said cyclic drive means operable to control the multicyclic operation of said actuating means in accordance with the differential setting of each successive one of said elements, means for sensing a differential setting greater than "1" of each successive one of said elements, means controlled by said sensing means to adjust said adjustable means, and means operable upon operation of said control key to initiate operation of said cyclic drive means and enable operation of said sensing means.

3. In a calculating machine for performing plural order multiplication operations having a shiftable register, a keyboard in which a value is set, a selection mechanism differentially settable by said keyboard upon entry of a value therein, a cyclically operable actuating means for cooperation with said selection mechanism to normally effect a single registration of the keyboard value in said register, a cyclic drive means for said actuating means, means for shifting said register in either direction relative to said selection mechanism, a control key, means operable to control the operation of said shifting means to shift said register in one direction to a predetermined position upon operation of said control key, a plural order multiplier selection mechanism including a shiftable carriage and ordinal elements in said carriage differentially settable from a "0" position, an escapement mechanism operable to move said carriage ordinally to active position, a multiplier keyboard mechanism for setting said elements and operating said escapement mechanism, means for ordinally shifting said carriage to inactive position, normally inactive means positionable successively for control by each of said elements in the "0" position thereof and in the active position of said carriage to effect operation of said shifting means to shift said register in the other direction and to enable operation of said carriage shifting means, and resilient means for enabling the active positioning of said normally inactive means in each ordinally shifted position of said carriage, the combination comprising means for restoring each successive element a single step to "0" from a differentially set position of "1" and in biunial steps to "0" or "1" from a differentially set position greater than "1" and operable upon restoration of each element to "0" to enable the operation of said normally inactive means, normally inoperative means operable by said selection mechanism and adjustable relative to said actuating means to effect a double registration of the keyboard value in said register, a cam operated means operable to control the adjustment of said adjustable means, means engageable with said normally inactive means and operable thereby upon operation of said resilient means to effect operation of said cam operated means, yieldable means normally inoperative to engage said engageable means with said normally inactive means, a latch means rendered operable by said engageable means upon operation thereof to maintain said cam operated means in the operative position, means operated by said register shifting means in the predetermined position of said register effective to enable the operation of said resilient means and said yieldable means and to effect operation of said restoring means, and a sensing means for each of said elements operable in the initial "0" and "1" position of the associated element to prevent operation of said yieldable means and operable upon restoration of each element to "1" position, when the initial differential setting of the element is greater than "1," to release said latch means and disengage said engageable means.

4. In a calculating machine for performing plural order multiplication operations, a shiftable product register, a keyboard settable to represent a multiplicand, a differentially operable actuating means, a cyclic drive means for said actuating means, a selection mechanism positionable by said keyboard upon entry of a multiplicand therein for control by said actuating means to effect a single registration of the multiplicand in said register with each operation of said drive means, a multiplier mechanism for receiving a plural digit multiplier factor including a shiftable carriage and means for shifting said carriage, ordinal elements in said carriage differentially settable from "0" to represent the digits of a multiplier, normally disabled means driven by said cyclic drive means for restoring successive ones of said differentially set elements in bi-incremental steps to "0" or "1" during a multiplying operation, means controlled by said elements successively upon restoration to "0" position and related to said actuating means and said shifting means to control successive operation thereof by said drive means in accordance with the values of the successive multiplier digits, auxiliary selection means positionable relative to said actuating means in accordance with the setting of said keyboard and operable upon each operation of said actuating means to effect a registration in said register twice that of the multiplicand in the keyboard, means selectively operable to control the positioning of said auxiliary means, means operable to sense the greater than "1" or the "1" and "0" positions of each successive element, and means controlled by said sensing means when sensing a differential setting greater than "1" to effect operation of said selectively operable means, and when sensing a "0" or "1" differential setting to disable the operation of said selectively operable means.

5. In a calculating machine for performing plural order multiplication operations, a shiftable product register, a normally operative selection mechanism differentially settable to represent a multiplicand, an actuating means therefor operable to effect a single registration of the multiplicand in said register, an auxiliary selection mechanism selectively positionable for cooperation with said actuating means to effect a dual registration of the multiplicand as represented by the setting of the first mentioned selection mechanism, a cyclic drive means for said actuating means, means for ordinally shifting said register, a multiplier mechanism including a plurality of ordinal elements differentially settable from a "0" position to represent the digits of a multiplier, a control key operable to initiate operation of said cyclic drive means, means rendered operable by said key upon operation thereof to successively sense a differential setting of each ordinal element representing a multiplier factor and to thereafter position said auxiliary selection mechanism for operation when sensing a value greater than "1," means associated with each of said elements and rendered operable thereby upon a differential setting of "1" to prevent the positioning of said auxiliary selection mechanism by said sensing means, and means driven by said cyclic drive means sequentially operatively related to each of said elements to control the operation of said actuating means in accordance with the setting of each of said elements and operable to control the operation of said shifting means at the end of each ordinal multiplying operation.

6. In a calculating machine, an accumulator, actuating means therefor, a cyclic drive means for said actuating means, means for controlling the sign character of registrations in said accumulator, means for shifting said accumulator relative to said actuating means, a selection mechanism differentially settable to represent a multiplicand and normally operable in cooperation with said actuating means to effect a single registration of the multiplicand in said accumulator in each cycle of operation, normally inactive means for setting said sign character controlling means, a power means driven by said cyclic drive means for actuating said setting means to adjust said sign character controlling means subsequent to the movement of said setting means to active position relative to said sign character controlling means, a plural order multiplier selection mechanism including a shiftable carriage and ordinal elements in said carriage differentially settable from a "0" position to represent the digits of a multiplier factor, an escapement mechanism for moving said carriage to an active position, means for shifting said carriage toward an inactive position, a keyboard mechanism for setting said elements and operating said escapement mechanism, normally inoperative means enabled sequentially by each adjusted one of said elements to actively position said setting means relative to said sign character controlling means, means driven by said cyclic drive means operable to restore said differentially settable elements sequentially and in biunial step-by-step fashion to "1" or "0" from a differentially set position and in a unial fashion from "1" to "0," a control member operated by the return of an operative one of said elements to its "0" position, means rendered operable by said control member in the operated position thereof to operate said accumulator shifting means and said carriage shifting means, an auxiliary selection means selectively settable differentially in accordance with the setting of said first mentioned selection mechanism and controlled by said actuating means to effect a dual registration of the represented multiplicand in said accumulator in each cycle of operation, a cam controlled means for setting said auxiliary means, a two-phase clutch having a drive connection with said cyclic drive means initially operable upon engagement with said drive means to effect operation of said cam controlled means, a manipulable means for effecting movement of said control member to operative position and initiating operation of said cyclic drive means, means engageable with said control member for control thereby to engage said two-phase clutch for its first phase of operation upon manipulation of said manipulable means, means controlled by said manipulable means upon operation thereof to selectively enable the engagement of said engageable means with said control member, means for latching said engageable means in clutch-engaging position, and means associated with each of said elements successively operable in the "0" position of said elements and in the set position of "1" thereof to prevent engagement of said engageable means and operable upon restoration of each successive element to release said latching means, thereby engaging said clutch for its second phase of operation to disable said auxiliary selection means.

7. In a calculating machine, a product register, a multiplicand selection mechanism differentially settable to represent a multiplicand, a keyboard for setting said multiplicand selection mechanism, an actuating means selectively operable to effect a single transmission and alternatively a multiple transmission of a multiplicand from said multiplicand selection mechanism into said register, a cyclic drive means for said actuating means, a multiplier selection mechanism including a plurality of ordinally arranged differentially settable elements to represent a multiplier factor, a keyboard mechanism for setting said multiplier selection mechanism, a multiplier control member operable in ordinal sequence by said elements to control a multiplication operation, means for sensing the differential setting of the operative one of said elements to predetermine the operation of said actuating means, and means driven by said cyclic drive means operable to control the operation of said actuating means in accordance with the setting of said multiplier selection mechanism as determined by said sensing means.

8. In a cyclically operable calculating machine, a product register, a selection mechanism differentially settable to represent a multiplicand, means for setting said selection mechanism, an actuating means normally operative in cooperation with said selection mechanism to effect a single registration of the multiplicand in said register in each cycle of operation, a drive mechanism for said actuating means, normally ineffectively positioned means associated with said selection mechanism adjustable for control by said actuating means to effect a double registration of the multiplicand in said register in each cycle of operation, a multiplication mechanism for controlling operation of said actuating means including a multiplier selection mechanism differentially settable to represent a multiplier factor, means for restoring said multiplier selection mechanism to zero in biunial step-by-step fashion to "1" or "0" and alternatively in a single step from a differentially set position of "1" to "0", said restoring means having a normally ineffective drive connection with said drive mechanism, means for sensing a plural unit differentially set position of said multiplier selection mechanism, means controlled by said sensing means for adjusting said adjustable means when a plural unit factor is differentially set in said multiplier selection mechanism, blocking means operable in the "0" and "1" position of said multiplier selection mechanism to prevent operation of said adjustable means and rendered operable by said multiplier selection mechanism to enable said controlled means to return said adjustable means to ineffective position upon operation of said restoring means to restore said multiplier selection means from a plural unit setting to either the "0" or "1" position thereof, and a plurality of manually operable control keys for enabling operation of said sensing means and the drive connection for said restoring means and initiating operation of said drive mechanism.

9. In a calculating machine, a product register, a differential actuating means therefor, a cyclic drive means for said actuating means, a selection mechanism settable relative to said actuating means for effecting a single registration of the multiplicand in said register in each cycle of operation, a multiplicand keyboard for setting said selection mechanism, an auxiliary means adjustable relative to said actuating means in accordance with the setting of said selection mechanism and operable upon operation of said actuating means to effect a registration in said register twice that of the multiplicand in said keyboard in each cycle of operation, normally inactive means for adjusting said auxiliary means, a two-phase clutch having a driving connection with said drive means operable in the first phase of operation to actively position said adjusting means and operable in the second phase to restore said adjusting means to inactive position, clutch control means normally operatively positioned to maintain said clutch disengaged in the full-cycle position thereof and operable upon movement to clutch-engaging position to disengage said clutch following semicyclic operation thereof, means for moving said clutch control means to operative position to initiate the first phase of clutch operation, a multiplier selection mechanism differentially settable from a "0" position to control the operation of said actuating means, means normally ineffective to restore said multiplier selection mechanism to either a "1" position or a "0" position in bi-incremental steps from a plural unit setting and in a single step to "0" position from a "1" position thereof, means for sensing a plural unit differential setting of said multiplier selection mechanism, a latch means for said moving means enabled by said sensing means to latch said clutch control means in operative position, blocking means operatively engaging said multiplier selection mechanism and operable in the "1" position and the "0" position of said multiplier selection mechanism to prevent operation of said sensing means and to disable said latch means, said blocking means being operable to release said latch means thereby effecting engagement of said clutch for the second phase of operation upon restoration of said multiplier selection mechanism to either the "1" or "0" position thereof, a control means for enabling operation of said sensing means and operable upon operation of said sensing means to control the operation of said moving means, a multiplication control mechanism for effecting operation of said control means, enabling said restore means, and initiating operation of said cyclic drive means, a manually operable means effective upon operation thereof to effect operation of said multiplication control mechanism.

10. In a calculating machine, an accumulator and a revolutions counter, a multiplicand selection mechanism, a multiplier selection mechanism including ordinally arranged multiplier value elements sequentially operable to control a multiplication operation and means for differentially setting such elements, cyclically operable means controlled by an operative one of said multiplier selection mechanism to effect a single transmission of a multiplicand from said multiplicand selection mechanism into said accumulator in each cycle of operation for a multiplier value of "1," an actuating means for said revolutions counter normally operable to effect a "1" registration in said counter for each operation of said cyclically operable means, selective means rendered operable by the operative one of said multiplier selection mechanism for control by said cyclically operable means to effect a multiple transmission of a multiplicand into said accumulator when the multiplier value is greater than "1," means operable with said actuating means and said selective means to control a plural unit registration in said counter equal to each multiple transmission of a multiplicand into said accumulator by said selective means, a control key, and means controlled by said key upon operation thereof to enable the operation of said selective means and said associated means and to initiate operation of said cyclically operable means.

11. In a calculating machine, a product register, a multiplicand selection mechanism differentially settable to represent a multiplicand, a keyboard for setting said multiplicand selection mechanism, a cyclically operable actuating means selectively operable to effect a single transmission and alternatively a multiple transmission of a multiplicand from said multiplicand selection mechanism into said register in each cycle of operation, a revolutions counter normally operable to register a single unit for each cycle of operation of said actuating means and adjustable to effect a plural unit registration in each cycle of operation corresponding to each multiple transmission of a multiplicand by said actuating means, a normally operative revolutions counter actuator for controlling a single unit registration in said counter adjustable to an inoperative position, a normally inoperative auxiliary means controlled by said counter actuator operable to actuate said revolutions counter in the adjusted position of the said revolutions counter, a cyclic drive means for said actuating means and said revolutions counter actuator and the auxiliary means, a multiplier selection mechanism including ordinally arranged differentially settable elements to represent a multiplier factor, a keyboard mechanism for setting said multiplier selection mechanism, means driven by said drive means to restore the element in an operative ordinal position unially to "0" from a lesser value differential position and multiunially from a greater value differential position means for sensing the differential setting of said multiplier selection mechanism to predetermine the operation of said actuating means and to control the adjustment of said revolutions counter to unial or multiunial operation, and means driven by said cyclic drive means operable to control the multicyclic operation of said actuating means in accordance with the setting of said multiplier selection mechanism as determined by said sensing means.

12. In a calculating machine having a product register, a selection mechanism settable to represent a multiplicand, a cyclically operable actuating means normally controlled by said selection means and operable to control a single registration of the multiplicand in said product register, means for shifting said register in either direction relative to said selection mechanism, and a multiplying mechanism comprising: a multiplier storage register having ordinally arranged differentially settable elements for controlling a plural order operation of said cyclically operable actuating means, means for differentially setting said elements, means for restoring the one of said differentially settable elements in a predetermined operative ordinal position a single step from a differentially set position of "1" and biunially step-by-step from a differentially set position greater than "1," normally inoperative means for ordinally adjusting the relative ordinal position of said elements and said restoring means, normally inactive multiplier control means operable by the restoration to its "0" position of the settable element in the predetermined ordinal position to control the operation of said shifting means to shift said register ordinally and to enable the operation of said adjusting means, means adjustable to effect a multiple registration of the multiplicand in said product register upon each cycle of operation of said actuating means, clutch controlled means for adjusting said adjustable means, means engageable with the one of said settable elements in the predetermined ordinal position for actuation thereby to effect operation of said clutch controlled means whenever such settable element is set for a value greater than "1," resilient means for effecting engagement of said engageable means, manual means for enabling operation of said actuating means, said resilient means and said restoring means, means for latching said engageable means in the actuated position, and sensing means for sequential cooperation with said positionable means and operable upon return of the one of said settable elements in the predetermined ordinal position to the set position of "1" to release said latching means and to disengage said engageable means.

13. In a calculating machine for performing plural order multiplication operations having a shiftable register, a keyboard in which a value is set, a selection mechanism differentially settable by said keyboard upon entry of a value therein, a cyclically operable actuating means for cooperation with said selection mechanism to normally effect a single registration of the keyboard value in said register, a cyclic drive means for said actuating means, means for shifting said register relative to said selection mechanism, a control key, a plural order multiplier selection mechanism including a plurality of ordinal elements differentially settable from a "0" position, a multiplier keyboard mechanism for differentially setting said elements, a shift control member operable by the "0" position of the one of said elements in a predetermined operative ordinal position, means operordinal elements with respect to said control member and ated by the control member for ordinally shifting said to enable operation of said register shifting means, and resilient means for enabling the active positioning of said control member in each relative ordinal position of said elements and said control member, the combination comprising means for restoring each successive element a single step to "0" from a differentially set position of "1" and in biunial steps to "0" or "1" from a differentially set position greater than "1" and operable upon restoration of each element to "0" to enable the operation of said control member, normally inoperative adjustable means operable by said selection mechanism and adjustable relative to said actuating means to effect a double registration of the keyboard value in said register, adjusting means driven by said drive means operable to control the adjustment of said adjustable means, a sensing member operable to sense the "0" and "1" or the greater than "1" positions of the element in the said operative ordinal position and operative to control the operation of said adjusting means, means operated by said control key to enable the operation of said resilient means and said sensing means and to effect operation of said restoring means.

References Cited in the file of this patent

UNITED STATES PATENTS

| 1,842,584 | Chase | Jan. 26, 1932 |
| 1,858,321 | Chase | May 17, 1932 |
| 2,794,595 | Ellerbeck | June 4, 1957 |

UNITED STATES PATENT OFFICE
CERTIFICATION OF CORRECTION

Patent No. 2,946,506                      July 26, 1960

Arthur J. Malavazos

It is hereby certified that error appears in the above numbered patent requiring correction and that the said Letters Patent should read as corrected below.

Column 2, line 7, after "showing" insert -- the --; line 12, after "tens" insert a hyphen; column 6, line 36, after "versa," insert -- single --; line 65, before "serves" insert -- and --; column 7, line 14, after "wheel" insert -- 110 --; line 24, for "ten-transfer" read -- tens-transfer --; column 25, lines 19 and 20, for "reprent" read -- represent --; column 33, line 51, for "postion" read -- position --; column 40, lines 17 and 18, for "ordinal elements with respect to said control member and ated by the control member for ordinally shifting said" read -- ated by the control member for ordinally shifting said ordinal elements with respect to said control member and --.

Signed and sealed this 6th day of June 1961.

(SEAL)
Attest:

ERNEST W. SWIDER                          DAVID L. LADD
Attesting Officer                      Commissioner of Patents